(12) United States Patent
Takayama et al.

(10) Patent No.: US 6,778,346 B2
(45) Date of Patent: Aug. 17, 2004

(54) RECORDING AND REPRODUCING APPARATUS AND FILE MANAGING METHOD USING THE SAME

(75) Inventors: Yoshihisa Takayama, Kanagawa (JP); Masaki Yamada, Kanagawa (JP); Yuko Obata, Kanagawa (JP); Nobuhisa Toshitani, Chiba (JP)

(73) Assignee: Sony Corporation, Tokyo (JP)

( * ) Notice: Subject to any disclaimer, the term of this patent is extended or adjusted under 35 U.S.C. 154(b) by 469 days.

(21) Appl. No.: 09/821,099

(22) Filed: Mar. 30, 2001

(65) Prior Publication Data

US 2002/0015249 A1 Feb. 7, 2002

(30) Foreign Application Priority Data

Mar. 30, 2000 (JP) ........................................ 2000-097925
Mar. 30, 2000 (JP) ........................................ 2000-097927

(51) Int. Cl.$^7$ ............................................. G11B 19/02
(52) U.S. Cl. ........................................... 360/69; 360/71
(58) Field of Search ........................ 360/69; 369/275.2; 707/204; 711/112, 4, 162; 714/7

(56) References Cited

U.S. PATENT DOCUMENTS

| | | | | |
|---|---|---|---|---|
| 4,541,019 A | * | 9/1985 | Precourt | ........................ 360/15 |
| 4,755,928 A | * | 7/1988 | Johnson et al. | ................. 714/6 |
| 4,947,367 A | * | 8/1990 | Chang et al. | .................. 710/65 |
| 5,144,501 A | * | 9/1992 | Inazawa et al. | ................ 360/48 |
| 5,438,674 A | * | 8/1995 | Keele et al. | .................... 711/4 |
| 5,596,707 A | * | 1/1997 | Ohta | .............................. 714/6 |
| 5,668,948 A | * | 9/1997 | Belknap et al. | .............. 709/231 |
| 5,710,676 A | * | 1/1998 | Fry et al. | .................... 360/72.1 |
| 6,029,179 A | * | 2/2000 | Kishi | ......................... 707/202 |
| 6,549,992 B1 | * | 4/2003 | Armangau et al. | .......... 711/162 |

* cited by examiner

*Primary Examiner*—David Hudspeth
*Assistant Examiner*—K. Wong
(74) *Attorney, Agent, or Firm*—Oblon, Spivak, McClelland, Maier & Neustadt, P.C.

(57) ABSTRACT

Hard disk drive unit with buffer and cue data areas efficiently records files to magnetic tape. Recording and reproducing apparatus includes changer unit for selecting and carrying tape cassettes and accommodating magnetic tapes with predetermined recording areas, tape drive unit for loading tape cassettes and recording and reproducing magnetic tapes, hard disk drive unit having a buffer area for recording and reproducing data in the tape drive unit, and controller unit for managing recording areas of tape cassette magnetic tapes arranged in the changer unit as a continuously formed area. Storage level is set corresponding to remaining capacity of buffer area and remaining capacity of one BOF data area, or number of past access times to corresponding file in a file information table and final access time, etc. Based on storage level, control operations are performed. Frequently used file data can be selectively recorded to buffer or BOF data areas.

12 Claims, 32 Drawing Sheets

RECORDING AREA OF
HARD DISK UNIT 3

E1 (BUFFER AREA)

FIG.12

| FILE ID | ATTRIBUTE | | NUMBER OF ACCESS TIMES | WRITE END TIME | DAY AND TIME OF FINAL ACCESS | START DIVISION NO. | FILE SIZE |
|---|---|---|---|---|---|---|---|
| | LEVEL | REPRODUC- TION RATE | | | | | |
| FILE #1 ID:F001 | 3 | 6Mbps | 4 | 2000:03/02 5:16 | 2000:03/09 11:37 | #1 | 4GB |
| FILE #2 ID:F002 | 6 | 27bps | 2 | 1999:11/12 9:12 | 2000:01/16 4:12 | #8 | 12.2GB |
| ⋯⋯ | ⋯⋯ | ⋯⋯ | ⋯⋯ | ⋯⋯ | ⋯⋯ | ⋯⋯ | ⋯⋯ |
| FILE #n ID:n | | | | | | | |

E2 (FILE INFORMATION TABLE)

FIG.13

| DIVISION NO. | STATUS CODE |
|---|---|
| 0 | OFFSET TO BLANK AREA |
| 1 | 0002h |
| 2 | 0003h |
| 3 | FFFFh |
| 4 | 0000h |
| 5 | 0006h |
| 6 | 0007h |
| 7 | 0001h |
| ⋮ | ⋮ |
| n | 0000h |
| n+1 | 0000h |
| ⋮ | 0000h |
| 8000 | 0000h |

Rows 4 = SPACE AREA
Rows n through 8000 = BLANK AREA

0000h ···· UNUSED DIVSION
0001h~ ··· NEXT DIVISION
FFFFh ···· FINAL DIVISION IN FILE

E3 (DIVISION ACCESS MAP)

FIG.18

| | |
|---|---|
| APPLICATION | Write "file #N" |
| FILE SYSTEM | Write #10 (data:a) |
| | Write #15 (data:b) |
| | Write #18 (data:c,d,e) |
| | Write #30 (data:f) |
| DRIVER | Create "file #N" |
| | Send realtime speed |
| | Wite (LB UNIT) |
| | ⋮ |
| | Close "file #N" |

FIG.19

| | |
|---|---|
| APPLICATION | Read "file #N" (from beginning) |
| FILE SYSTEM | Read #10 |
| DRIVER | Open "file #N" |
| | Read (LB UNIT) |
| | ⋮ |
| | Close "file #N" |

FIG.20

| | |
|---|---|
| APPLICATION | Read "file #N" (from middle) |
| FILE SYSTEM | Read #15 |
| DRIVER | Open "file #N" |
| | Set realtime mode on |
| | Space |
| | Read (LB UNIT) |
| | ⋮ |
| | Close "file #N" |

FIG.21

REQUEST EXECUTION OF WRITING OF FILE SYSTEM — S001

ISSUE WRITE LBA OF RANDOM ACCESS TO DRIVER UNIT — S002

SEQUENTIALLY REGISTER LBA TO LBA MANAGEMENT TABLE — S003

ISSUE SEQUENTIAL WRITE COMMAND — S004

FIG.27

| PART OF FILE EXISTS IN BUFFER AREA OF HARD DISK | BOF DATA EXISTS IN BOF AREA | PART OF FILE EXISTS ON TAPE | STORAGE LEVEL |
|---|---|---|---|
| 1 | 1 | 1 | 7 |
| 1 | 1 | 0 | 6 |
| 0 | 1 | 1 | 3 |
| 0 | 0 | 1 | 1 |
| 0 | 0 | 0 | 0 (INITIAL VALUE) |

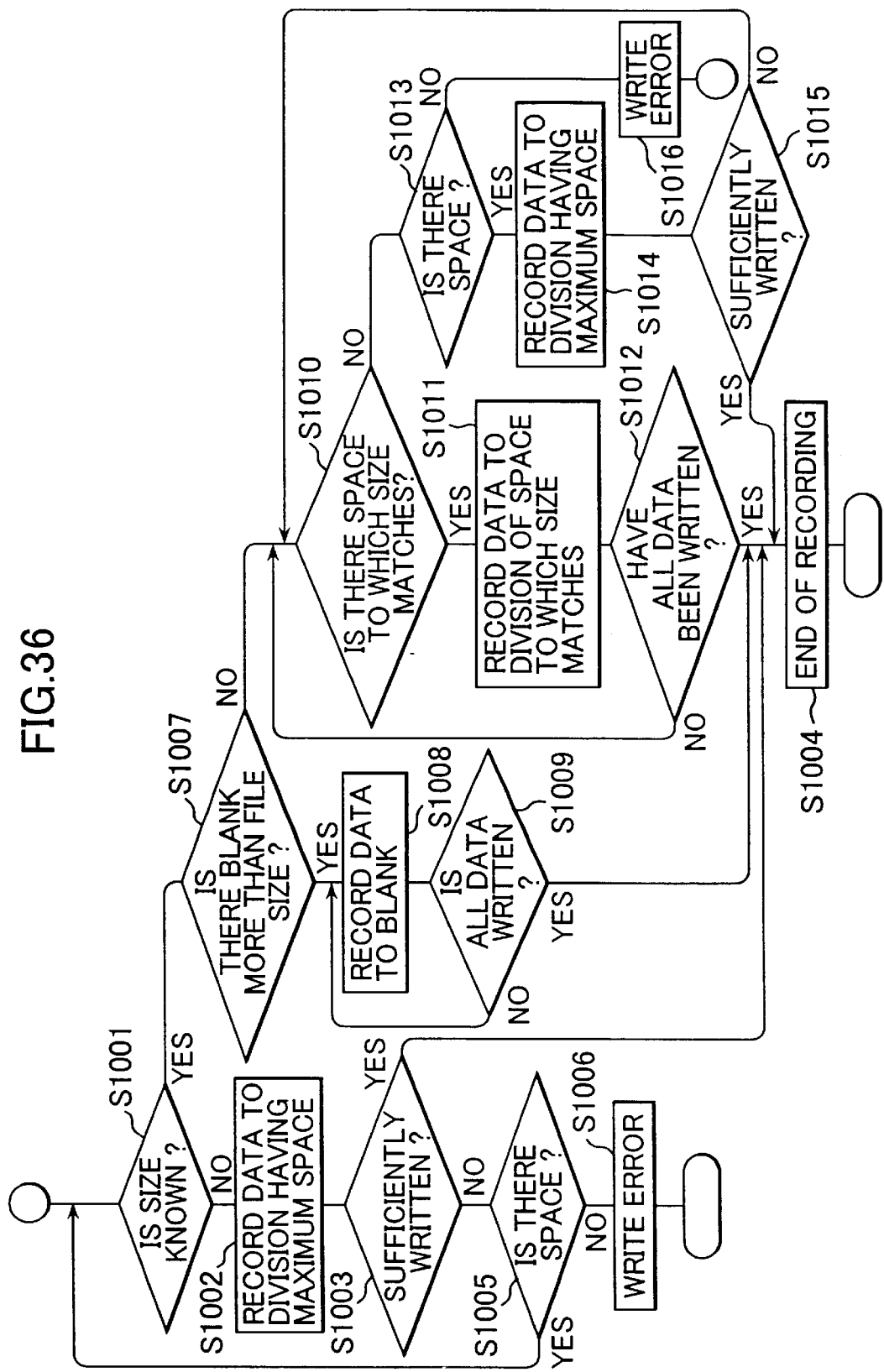

RECORDING AND REPRODUCING APPARATUS AND FILE MANAGING METHOD USING THE SAME

BACKGROUND OF THE INVENTION

1. Field of the Invention

The present invention relates to a recording and reproducing apparatus suitable for recording and reproducing data having a large capacity in real time and a file managing method using the apparatus.

2. Description of the Related Art

Recently, a tape drive apparatus (such as a tape streamer drive apparatus) and a hard disk apparatus can record the video image of a movie, etc. as image data. Operation for recording video data requires a recording medium capable of real-time recording and reproduction and of recording of a large capacity. Then, recording operation is performed by individually using a hard disk apparatus using a high-speed accessible magnetic disk as a recording medium and a tape drive apparatus using a magnetic tape having a large recording capacity as a recording medium.

If a large capacity of data can be ensured in the hard disk apparatus, the overall file can be recorded. In this case, any desired portion in the file can be fast accessed. However, if a capacity to record the overall file cannot be ensured, for example, a method is adopted whereby the head portion (cue data) in the file of the video data is recorded in the hard disk apparatus and the whole or the remaining data is recorded to the magnetic tape by the tape drive apparatus. For this method, it is considered that the capacity of the hard disk apparatus smaller than that of the magnetic tape is effectively used. Consequently, when a user searches desired video data, the head of the file can be fast accessed. After that, the desired video data is reproduced from the tape drive apparatus.

However, when recording is performed by using the tape drive apparatus, a large capacity of data, for example, several ten gigabytes (GB) can be recorded depending on the capacity of the magnetic tape as a recording medium. However, the tape drive apparatus reproduces data by sequentially accessing one magnetic tape, thus taking a long time for search and reproduction of the cue data. Therefore, if considering time necessary for searching and reproduction of the cue data, the tape drive apparatus is not suitable to continuously record and reproduce, in particular, a video image in real time.

In the hard disk apparatus, the fast access is possible and data can be recorded and reproduced in the real time manner. However, the hard disk apparatus has a problem that a storage capacity is smaller than that of the magnetic tape and it is not sufficient to record the video image having a large capacity. If only the head portion (cue data) is recorded, the kind of video data is increased and, then, there is a problem that a recording capacity becomes insufficient and satisfactory data cannot be stored.

SUMMARY OF THE INVENTION

In order to overcome the above-mentioned problems, according to the present invention, there is provided a recording and reproducing apparatus comprising: changer means for selecting and carrying a plurality of tape cassettes that are arranged therein and accommodate magnetic tapes on which a plurality of recording areas on a predetermined unit are formed; tape drive means for loading the tape cassette carried by the changer means and for recording and reproducing the magnetic tape accommodated in the tape cassette; hard disk drive means at least having a buffer area for recording and reproducing data by the tape drive means and cue data area for recording cue data as part of a file recorded to the magnetic tape; recording area managing means for managing each recording area of the magnetic tape accommodated in the tape cassette arranged in the changer means as a continuously formed area; recording state managing means for managing the recording states of the file in the magnetic tape, the buffer area, and a cue data area; file recording control means for controlling operation for recording the file in the magnetic tape and the buffer area; cue data recording control means for forming cue data of the file and for recording the formed data to the cue data area; and erasing control means for controlling operation for erasing the file recorded or the cue data the file.

According to the present invention, a recording and reproducing apparatus can be realized to enable the recording and reproduction of a large capacity of data in real time by using the capacity of a magnetic tape loaded by changer means and fast access of hard disk means.

According to the present invention, the capacity of the hard disk apparatus can be effectively used in accordance with using frequency of a file, and data of a file with high using frequency can be reproduced by fast access.

BRIEF DESCRIPTION OF THE DRAWINGS

FIG. 12 is a diagram for illustrating a file information table;

FIG. 13 is a diagram for illustrating a division access map;

FIG. 18 is a diagram for illustrating examples of commands which are outputted to the data storage device from the driver unit upon recording the data;

FIG. 19 is a diagram for illustrating examples of commands which are outputted to the data storage device from the driver unit upon reproducing the data;

FIG. 20 is a diagram for illustrating examples of commands which are outputted to the data storage device from the driver unit upon recording the data;

FIG. 21 is a flowchart for illustrating processing steps on the computer device upon recording the data;

FIG. 27 is a diagram for illustrating the storage level;

FIG. 36 is a flow chart for illustrating steps of selecting the division to which data is recorded.

DESCRIPTION OF THE PREFERRED EMBODIMENTS

Figure 1:
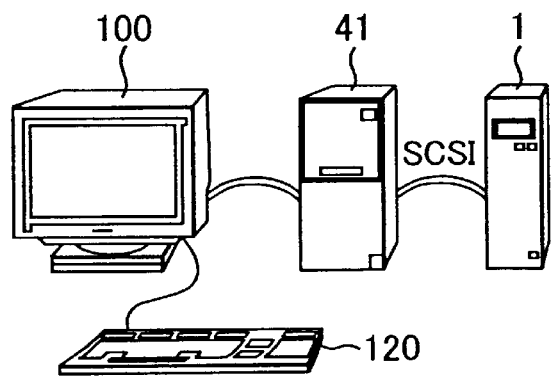
FIG. 1 is an external view showing the overall data storage system according to an embodiment of the present invention.

An embodiment of the present invention will be described in the following order.
1. Overall System 1-1. External view and block diagram
1-2. Block diagram of data storage device
1-3. Block diagram of tape drive unit
1-4. Data flow at the time of recording and reproduction
1-5. Layout of magnetic tape
1-6. Size of division corresponding to section
1-7. Constitutional example of changer unit
1-8. Hard disk unit 2. File System 2-1. Example of structure of host computer device
2-2. Example of command outputted by driver unit
2-3. Process on computer device
2-4. Processes on data storage device 3. Storage Level of Data 3-1. Recording and reproduction routes of BOF data
3-2. Storage level
3-3. Update of storage level
3-4. Life cycle of file
4. Selection of division 1. Overall System
1-1. External view and block diagram FIG. 1 is an external view showing the overall data storage system according to the present embodiment. In the figure, a computer device 41 comprises a personal computer, etc. as host computers, and required operation can be performed by a keyboard 120. A monitor device 100 displays thereon an operational image for interface formed by the computer device 41 (on a window system based on a GUI (Graphic User Interface), etc.). Thus, a user can execute various operations of the computer device 41 in accordance with the operational image displayed on the monitor device 100.

By iconifying a hard disk drive and a floppy disk drive device which are integrated in the computer device 41 and also iconifying a disc drive device for reading out data which is recorded to disc-shaped recording media such as a CD (Compact Disc) and a CD-ROM (Compact Disc Read Only Memory), the iconified images become the operational images displayed on the monitor device 100. Therefore, when the user refers to contents of data which are stored in the hard disk device, the user selects an icon corresponding to the hard disk device by required operation, thereby displaying a window corresponding to the hard disk device. Then, the window therein displays icons corresponding to various files and application programs which are stored in the hard disk device.

As a consequence, the user views the window and, thereby, can visually grasp the presence or absence of the file. Thus, the processing sequence can shift to a step of selecting the various files and a step of starting of application software (application).

A data storage device 1 of the present embodiment is connected to the computer device 41 via interface means such as an SCSI (Small Computer Serious Interface). In other words, the data storage device 1 is structured as an external storage device connected to the computer device 41.

Figure 2:
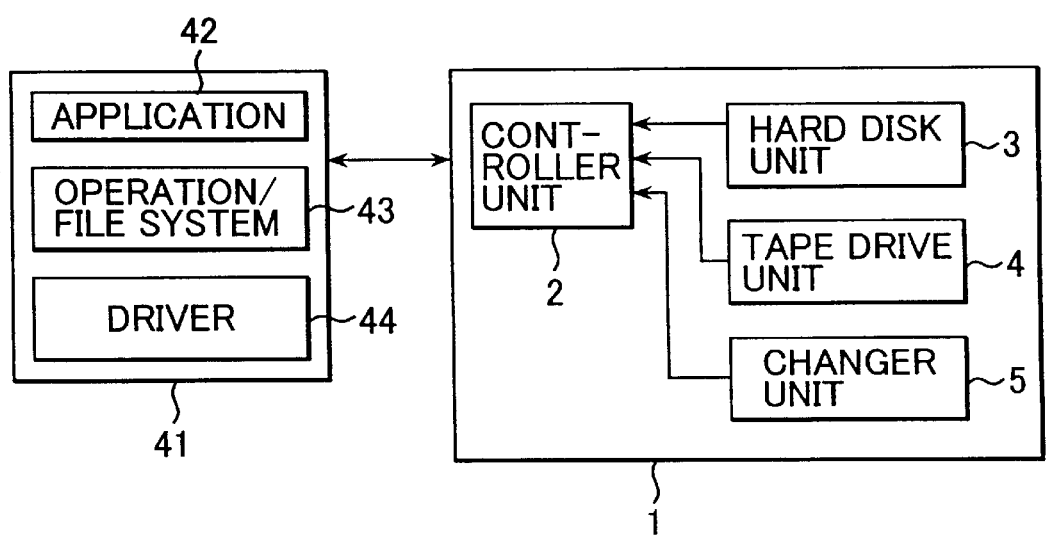
FIG. 2 is a block diagram for illustrating an example of the constitution of a computer device and a data storage device.

FIG. 2 is a block diagram for illustrating an example of the constitution of the computer device 41 and the data storage device 1.

The data storage device 1 comprises input/output means of data to the computer device 41 such as an SCSI interface and a controller unit 2 having a controller for various control operation of the data storage device 1.

Formed in a hard disk unit 3, are a buffer area for recording data, for example, a file consisting of a video image, supplied from the computer device 41 to a magnetic tape (not shown) loaded to the tape drive unit 4 or for reproducing data recorded to the magnetic tape; an area to which management information of the file recorded to the magnetic tape is recorded; a data storage area for cue data used at the time of reproduction, etc.; and an area for recording temporary data corresponding to a case wherein reading operation of data stops during access.

As the case may be, data transferred by the computer device 41 might be recorded only to the hard disk unit 3 or only to the magnetic tape.

The tape drive unit 4 can record and reproduce data by using the magnetic tape, as a recording medium, accommodated in tape cassette to be loaded by a changer unit 5. Note that recording areas on a division unit basis are formed on the magnetic tape, which will be described later.

When recording data, data stored in the buffer area of the hard disk unit 3 is recorded to a required division. When reproducing data, data stored in the division is outputted to the buffer area of the hard disk unit 3.

The changer unit 5 comprises rack means for enclosing twenty tape cassettes in the present embodiment. The changer unit 5 selects a specific tape cassette for recording and reproduction from the twenty tape cassettes enclosed in the rack means, and carries the selected tape cassette to the tape drive unit 4. However, the magnetic tapes accommodated in the twenty tape cassettes are not independent recording media, respectively, but are handled as a single magnetic tape.

That is, the data storage unit 1 comprises a recording medium having a capacity corresponding to, for example, twenty tape cassettes which are provided in the hard disk unit 3 and the changer unit 5.

In the computer device 41, stored in a hard disk unit (not shown) provided as storage means of the computer device 41, are at least application software 42 (hereinalter, referred to as application), an operation/file system 43 (hereinalter, referred to as a file system), and a driver unit 44 serving as software for controlling the data storage unit 1.

Figure 3:
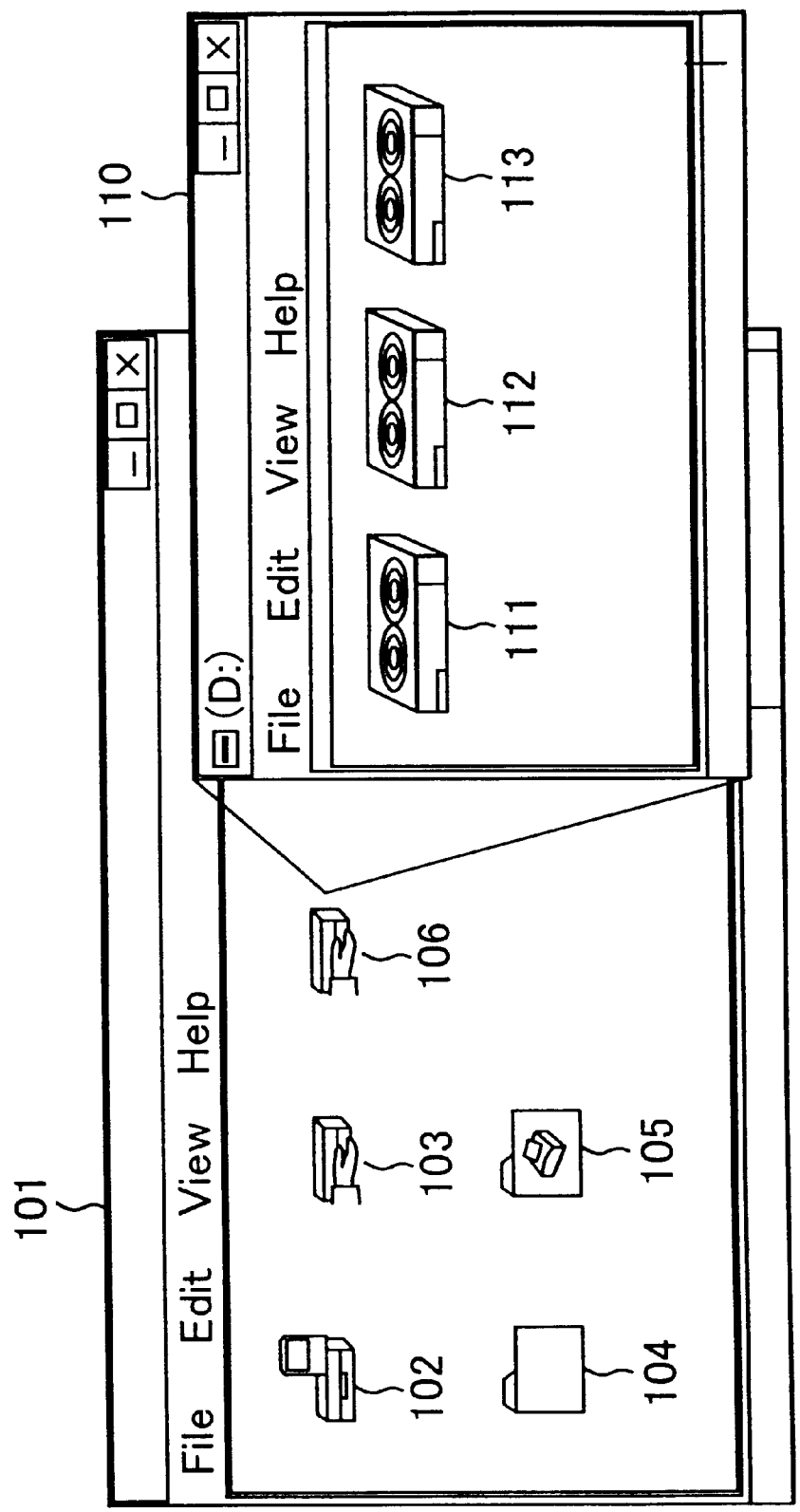
FIG. 3 is a diagram for illustrating a display example of a window displayed on a monitor device.

Although only the main portion is shown in FIG. 3, the computer device 41 comprises a drive unit of a disc-shaped recording medium such as a floppy disk and a CD-ROM, and a CPU (Central Processing Unit) for various operations, etc. and also is used as a general computer device.

FIG. 3 shows a window screen, as an example, which is structured as a GUI by the computer device 41 and is displayed on the monitor device 100 corresponding to the data storage unit 1.

A window 101 displays thereon the overall computer device 41, and displays, e.g., an icon 102 indicating a floppy disk drive, an icon 103 indicating a hard disk drive, icons 104 and 105 indicating setting holders including operational items for various setting, and an icon 106 corresponding to the data storage device 1 of the present embodiment.

The window 110 displays thereon icons 111, 112, and 113 corresponding to contents of the data storage device 1 as windows opened in the case of selecting the icon 106. As mentioned above, in the data storage unit 1, a plurality of (twenty in the present embodiment) tape cassettes constitutes one recording medium. Therefore, the icons 111, 112, and 113 do not correspond to the hard disk unit 3 of the data storage unit 1 or tape cassette unit basis, and are formed every file corresponding to a move, etc. which is stored in the hard disk unit 3 or magnetic tape.

That is, the data storage device 1 allows the computer device 41 to be recognized as a single drive device, similarly to the hard disk drive device, etc. having a large capacity by using the hard disk unit 3 or the tape cassettes.

1-2. Block Diagram of Data Storage Device

Figure 4:
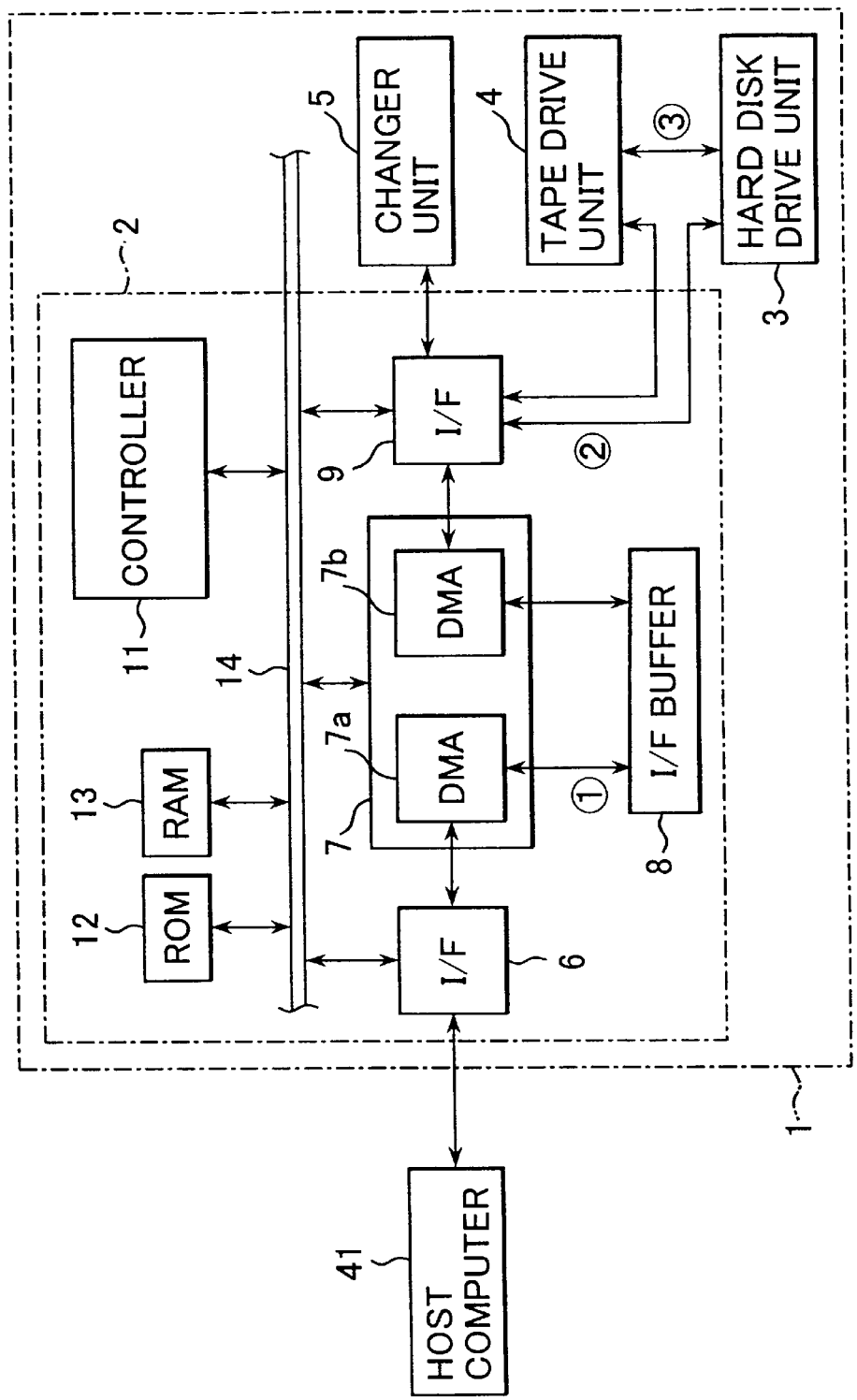
FIG. 4 is a block diagram for illustrating an example of the constitution of the data storage device.

FIG. 4 is a block diagram for illuminating an example of the constitution of the data storage device 1. The controller unit 2 will be described with reference to FIG. 4.

The controller unit 2 has, as a data route upon recording or reproduction, an interface unit (hereinalter, abbreviated to an I/F unit) 6, a buffer controller unit 7, an I/F buffer 8, and an interface unit 9.

The I/F unit 6 is disposed between the computer device 41 and the data storage device 1 and functions as input and output means for data communication between the data storage device 1 and the computer device 41 upon recording and reproduction.

The buffer controller unit 7 comprises, for example, direct memory accesses 7a and 7b for controlling data transfer between the I/F unit 6 and the I/F unit 9. The I/F buffer 8 functions as a buffer memory of the buffer controller unit 7.

The I/F unit 9 functions as interface means used for data transfer between the hard disk unit 3 and the tape drive unit 4 in the data storage device 1.

When data transferred from the computer device 41 is recorded to the hard disk unit 3 and when data reproduced by the tape drive unit 4 is transferred to the computer device 41, the data is transferred via the I/F unit 9. However, when data stored in the hard disk unit 3 is supplied to the tape drive unit 4, the data is directly transferred between the hard disk unit 3 and the tape drive unit 4.

In the case of recording, the data transferred from the computer device 41 is supplied to the direct memory access 7a via the I/F unit 6 and, then, is stored in the I/F buffer 8. The data stored in the I/F buffer 8 is read out by the direct memory access 7b and, then, is supplied to the hard disk unit 3 via the I/F unit 9.

In the case of reproduction, the data read by the hard disk unit 3 or tape drive unit 4 is supplied to the direct memory access 7b via the I/F unit 9 and is stored in the I/F buffer 8. The data stored in the I/F buffer 8 is read out by the direct memory access 7a and is transferred to the computer device 41 via the I/F unit 6.

The controller 11 comprises, for example, a microcomputer, etc., and controls components of the above-mentioned controller unit 2 via the I/F unit 9 upon recording and reproduction, thereby controlling the overall operation of the data storage device 1.

The controller 11 controls the changer unit 5 via the bus 14. In other words, based on a variety of commands corresponding to the recording or the reproduction which are supplied by the computer device 41 via the I/F unit 6, the controller 11 also controls operation for allowing a predetermined tape cassette enclosing therein the magnetic tape for recording and reproducing data to be carried to the tape drive unit 4. This control operation is based not only on the information supplied by the computer device 41 and a use status (management information) of the tape cassette stored in the hard disk unit 3.

Stored in a ROM 12 and a RAM 13, is data used for various processes when the controller 11 controls the recording or reproducing operation of the data. For example, a constant, etc. used for control operation are stored in the ROM 12. Also, the RAM 13 is used as a work memory.

Incidentally, the ROM 12 and RAM 13 are used as internal memories of a microcomputer constituting the controller 11.

1-3. Block Diagram of Tape Drive Unit

Figure 5:
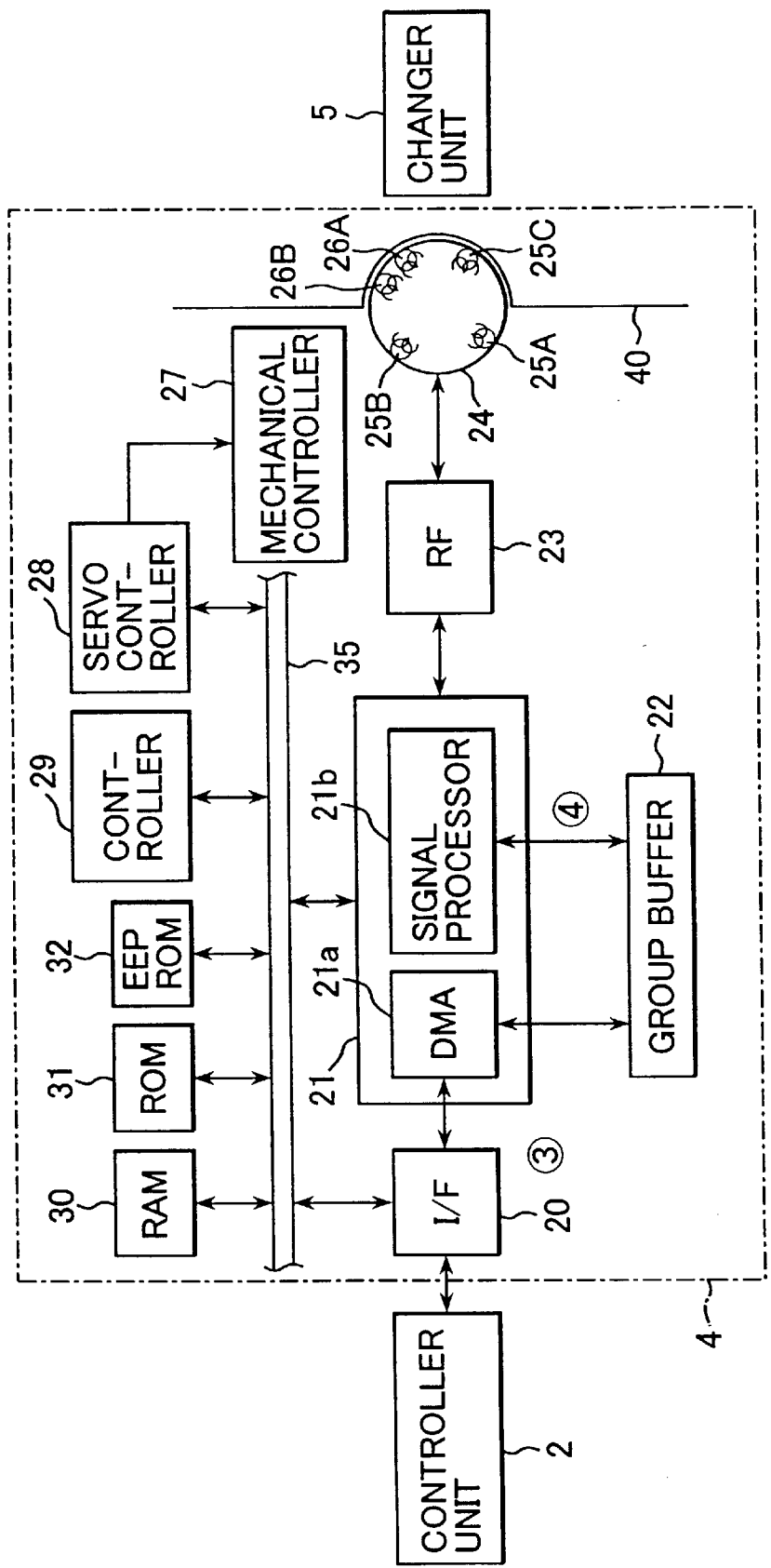
FIG. 5 is a block diagram for illustrating an example of the constitution of a tape drive unit.

FIG. 5 is a block diagram for illustrating an example of the tape drive unit 4.

As a route of data upon recording or reproduction, the tape drive unit 4 has: an I/F unit 20; a controller unit 21; a group buffer 22; and an RF processing unit 23. Further, at a predetermined position around a rotational drum 24, the tape drive unit 4 also has: a reproducing heads 25A, 25B, and 25C; and recording heads 26A and 26B.

The I/F unit 20 functions as input/output means of data to the controller unit 2.

The controller unit 21 comprises a direct memory access 21a and a signal processor 21b, and controls data transfer between the I/F unit 20 and the RF processing unit 23. The signal processor 21b performs required error correcting process, etc. for recording data and reproduction data.

The RF processing unit 23 generates a recording signal to be recorded to the magnetic tape 40 and also generates reproduction data based on a reproduction signal which is read out by the magnetic tape 40.

Upon recording, the RF processing unit 23 amplifies the recording data supplied by the controller unit 21, executes processes such as recording equalization, generates the recording signal, and supplies the generated recording signal to the recording heads 26A and 26B. As a consequence, the data is recorded to the magnetic tape 40 by the recording heads 26A and 26B.

Also, upon reproducing the recording data of the magnetic tape 40, RF reproduction signal, which is read out by reproducing heads 13A and 13B is supplied as a reproduction output, and the supplied signal is subjected to reproduction equalization, reproduction-clock generation, binarization, and decoding (for example, Viterbi decoding), etc.

A mechanical controller 27 applies a required drive voltage to a drum motor, a capstan motor, a reel motor, a loading motor, an ejection motor, etc., respectively, so as to rotate the drive motors.

The mechanical controller 27 drives the individual motors based on the control operation by a servo controller 28. The servo controller 28 controls a rotational speed of each motor, thereby executing playing upon normal recording and reproduction, playing upon fast reproduction, and tape playing upon fast forward and rewinding, etc.

Incidentally, stored in an EEP-ROM 32, are a constant, etc. which the servo controller 28 uses for servo control operation of the respective motors.

A controller 29 comprises a microcomputer, etc., and controls, via a bus 35, each component of the tape drive unit 4 on the basis of the various commands supplied via the controller unit 2 by the computer device 41 when recording and reproduction, etc. Are performed. In the case of recording the data, the controller 29 controls the execution of fast forward to a recorded position of the magnetic tape 40 in the tape cassette loaded by the changer unit 5, and also controls operation that the recording data is supplied the recording heads 26A and 26B. In the case of reproducing the data, the controller 29 controls the execution of fast forward, etc. to a reproducing position of the magnetic tape 40 in the loaded tape cassette.

Similarly to the ROM 12 and RAM 13 shown as components of the controller unit 2 in FIG. 4, stored in a ROM 30 and a RAM 31, is data used for various processes when the controller 29 controls the recording or reproducing operation of the data. For example, a constant, etc. used for control operation are stored in the ROM 30. Also, the RAM 31 is used as a work memory.

1-4. Flow of Data at the Time of Recording and Reproduction

Herein, a description is given of a flow of a series of data in the data storage device 1 at the time of recording with reference to schematic diagrams of FIGS. 6A to 6D.

As shown in FIG. 6A, when transferring the recording data from the computer device 41 to the data storage device 1, first, the recording data is stored in the I/F buffer 8 (route ① in FIG. 4). Next, as shown in FIG. 6B, the data stored in the I/F buffer 8 is transferred to the hard disk unit 3 (route ② in FIG. 4). Accordingly, the recording data is stored in, for example, the buffer area of the hard disk unit 3. The transition of the data transfer shown in FIGS. 6A and 6B depends on the capacity of the I/F buffer 8, and is implemented at the time that a predetermined amount of data is stored in the I/F buffer 8.

Subsequently, when the data stored in the hard disk unit 3 is transferred to the tape drive unit 4 and is recorded to the magnetic tape 40, as shown in FIG. 6C, first, the data is stored in a group buffer 22 of the tape drive unit 4. (route ③ in FIG. 4). As shown in FIG. 6D, recorded to the magnetic tape 40, is the data read out on a group unit basis by the group buffer 22 (route ④ in FIG. 4). The transition of the data transfer shown in FIGS. 6C and 6D depends on the capacity of the group buffer 22, and is implemented at the time that e.g., data on one group unit is stored in the I/F buffer 22.

Incidentally, the transition of the data transfer shown in FIGS. 6B and 6C (route ③ in FIG. 4) can be implemented by a "COPY" command via, e.g., the SCSI interface. However, if applying interface means having no command corresponding to the "COPY" command such as an ATA (AT Attachment), data is transferred via the I/F buffer 8.

Figure 6:
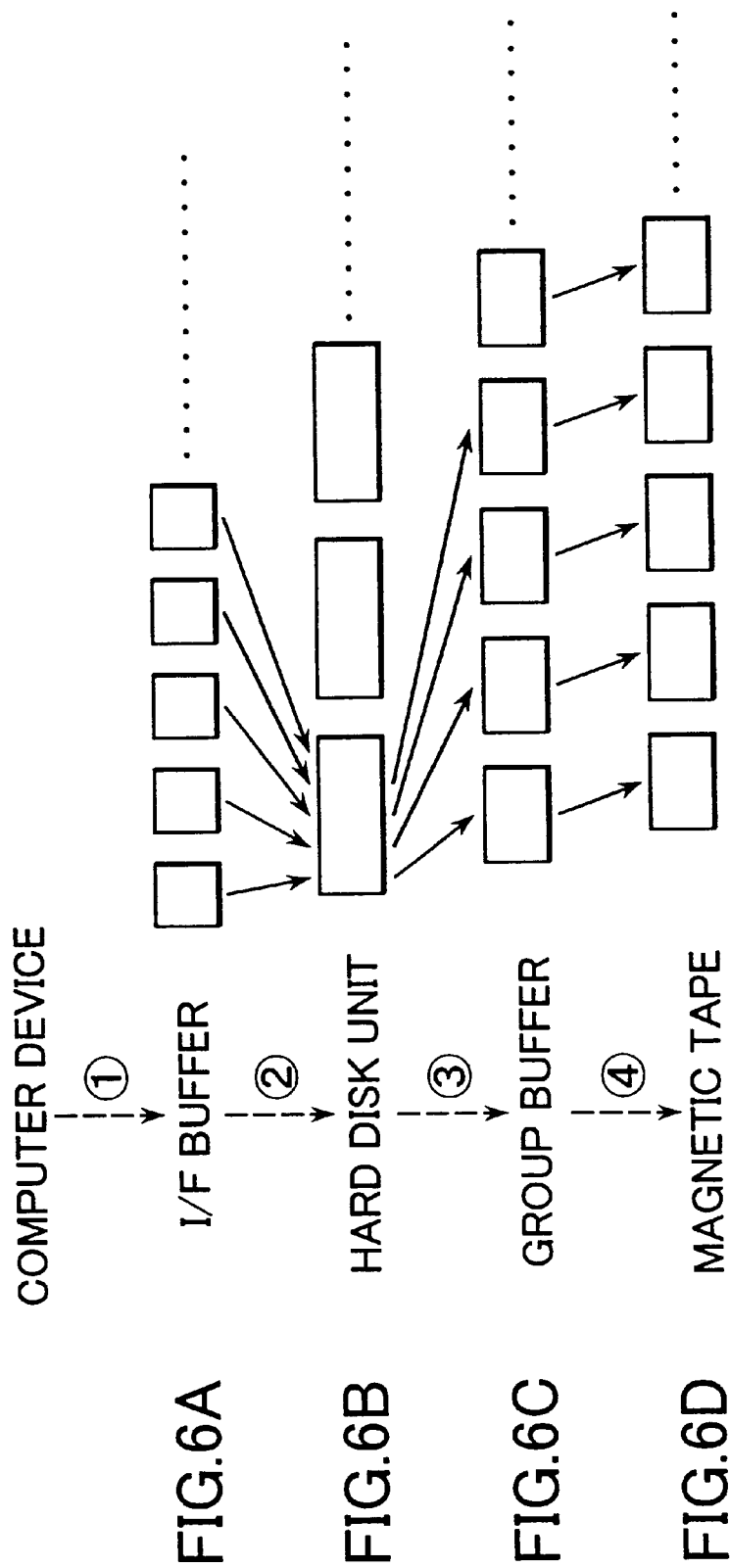
FIGS. 6A to 6D are schematic diagrams for illustrating a data flow for recording data transferred by the computer device to the magnetic tape.

Therefore, the transition shown in FIGS. 6 and 6C is performed at an interval based on a size of the buffer area of the hard disk unit 3. The transition as shown in FIGS. 6A and 6B and the transition as shown in FIGS. 6C and 6D are performed for a period which is relatively shorter than the transition shown in FIGS. 6B and 6C.

1-5. Layout of Magnetic Tape

FIGS. 7A to 7D are schematic diagrams for illuminating a layout of the magnetic tape 40 which is rewound and enclosed in a required reel in the tape cassette. In the present embodiment, it is assumed that a recording area of the magnetic tape 40 has a capacity of 50 GB (gigabytes).

Figure 7:
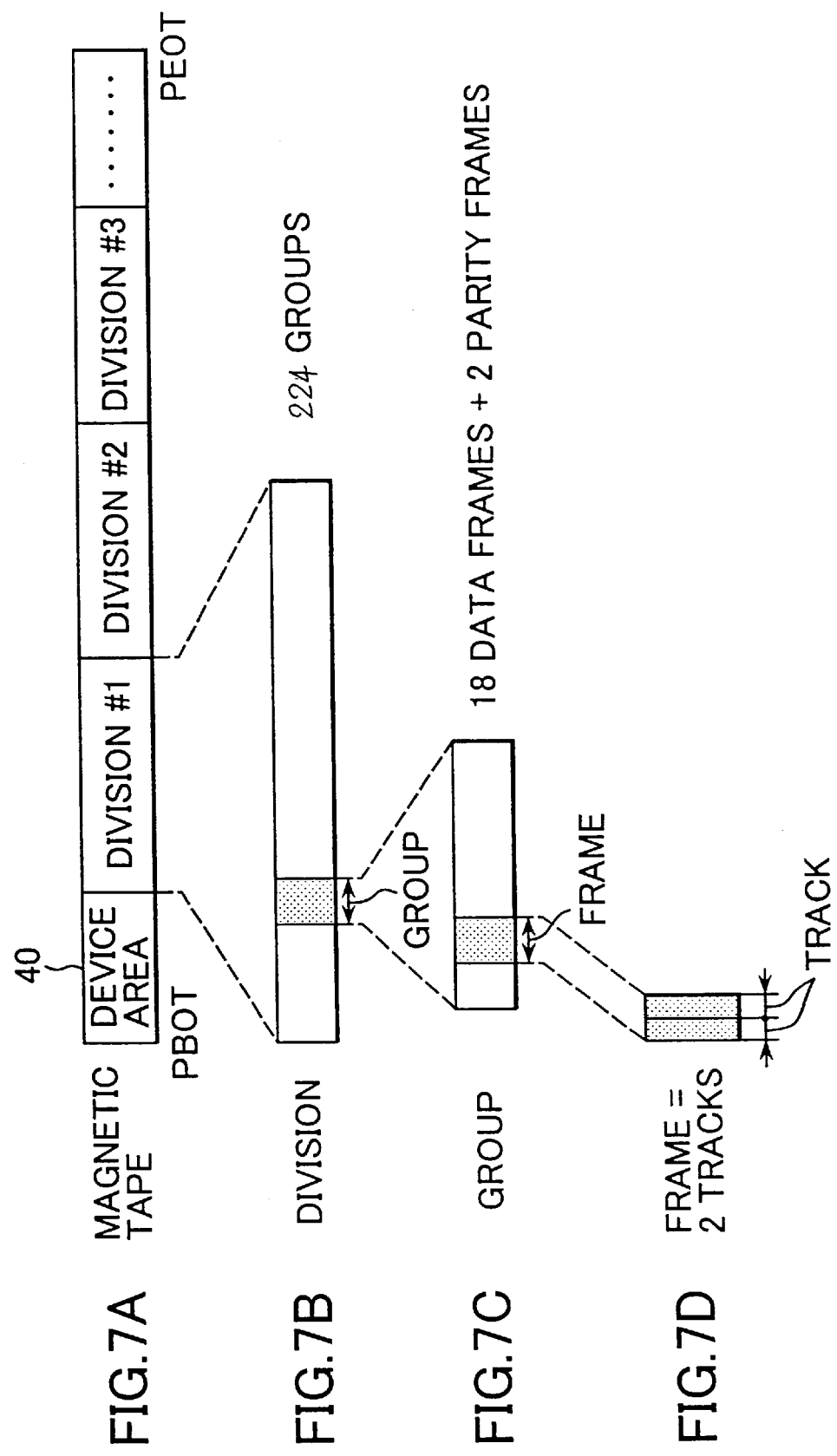
FIGS. 7A to 7D are diagrams for illustrating a layout of the magnetic tape.

FIG. 7A schematic shows one magnetic tape 40.

A reader tape (not shown) is physically positioned at the head of a first part of the magnetic tape 40. At next thereto, a device area is provided as an area for loading and unloading the tape cassette. The head of the device area becomes a head position PBOT (Physical Beginning of Tape) of the physical tape.

Subsequently to the device area, a recording area for recording the data is formed. The recording area is used by dividing the recording area on a minimum unit, namely, a division, to execute the required recording and reproduction. Division numbers are given to the divisions shown in the figure and are managed as exemplified by divisions #1, #2, #3, . . . . In the present embodiment, as will be described later, for example, total 400 divisions of divisions #1 to #400 are formed. Also, in the present embodiment, an end portion of the last division serving as the division #400 becomes an end position PEOT (Physical End of Tape) of the physical tape.

Data recording unit in one division as shown in FIG. 7B can be obtained by dividing data based on a unit of a fixed length, a so-called group as shown in FIG. 7C. As shown in the figure, one division comprises by 224 groups. For example, the data transferred by the computer device 41 is supplied via the hard disk unit 3 to the tape drive unit 4 on the group unit basis.

One group corresponds to a data amount of 20 frames. For example, the 20 frames are constructed by 18 data frames and two parity frames. As shown in FIG. 7D, one frame comprises two tracks. In this case, the two tracks constituting the one frame becomes a plus azimuth and a minus azimuth which are adjacent to each other. Therefore, one group comprises 40 tracks.

1-6. Changer Unit

Figure 8:
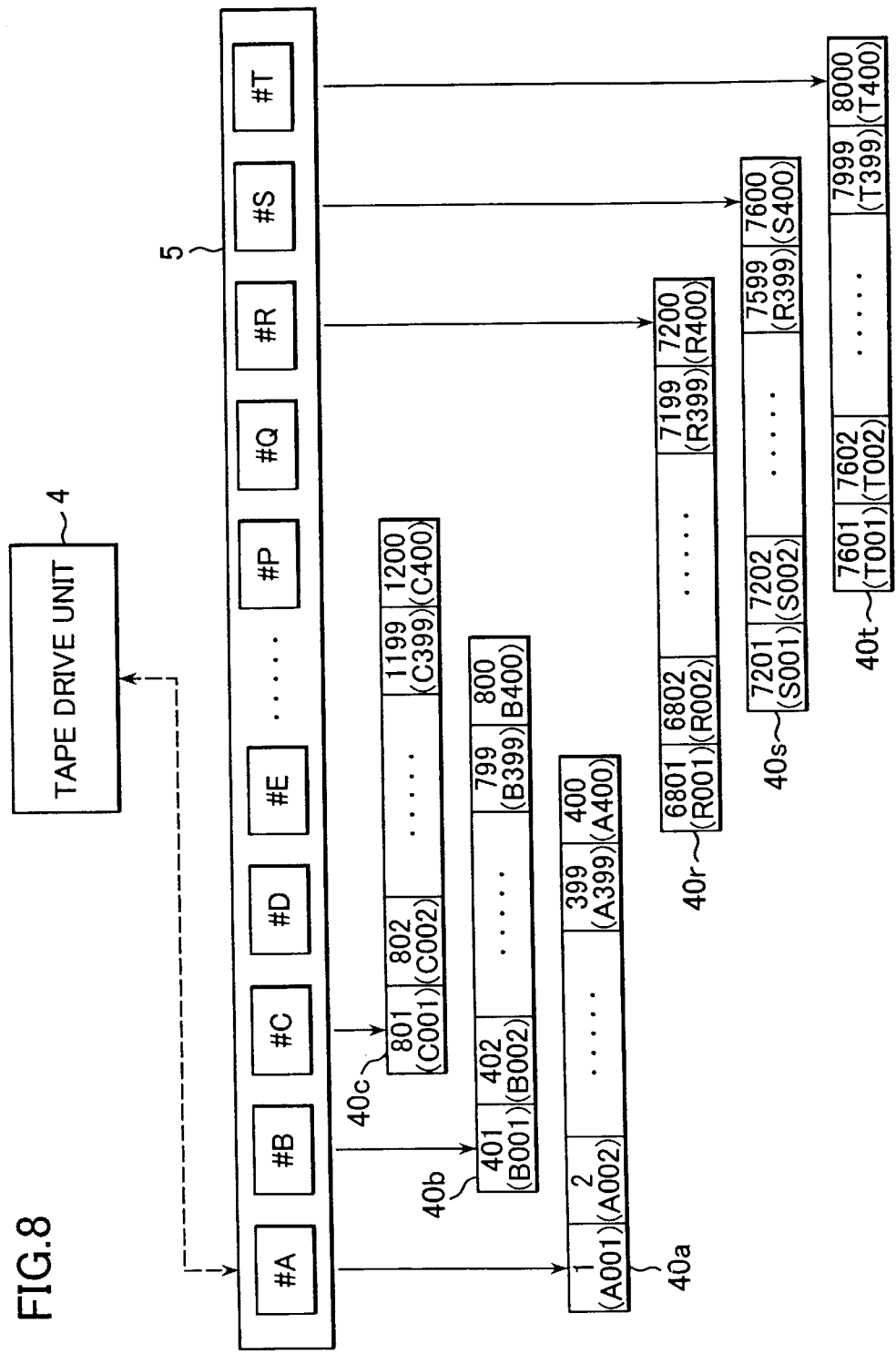
FIG. 8 is a diagram for illustrating a division of the magnetic tape which is disposed to a changer unit.

FIG. 8 is a schematic diagram showing a layout of the tape cassettes which are loaded to the rack means in the changer unit 5 and a layout of the magnetic tape 40 which is rewound in the individual tape cassettes.

Note that total 20 tape cassettes of #A to #T are loaded, and the device area is omitted in the layout of the magnetic tape 40 (a to t) which is loaded to the individual tape cassettes.

As mentioned above, for example, the 400 divisions are formed onto the magnetic tape 40. Accordingly, if paying attention to the magnetic tape 40*a* of the tape cassette #A, obviously, divisions "A001" to "A400" (shown in parentheses) are formed.

Likewise, 400 divisions are formed to the respective magnetic tapes, for example, divisions "B001" to "B400" are formed onto a magnetic tape 40*b*; divisions "C001" to "C400" are formed onto a magnetic tape 40*c*; divisions "R001" to "R400" are formed onto a magnetic tape 40*r*, divisions "S001" to "S400" are formed onto a magnetic tape 40*s*, and divisions "T001" to "T400" are formed onto a magnetic 40T.

Figure 9:
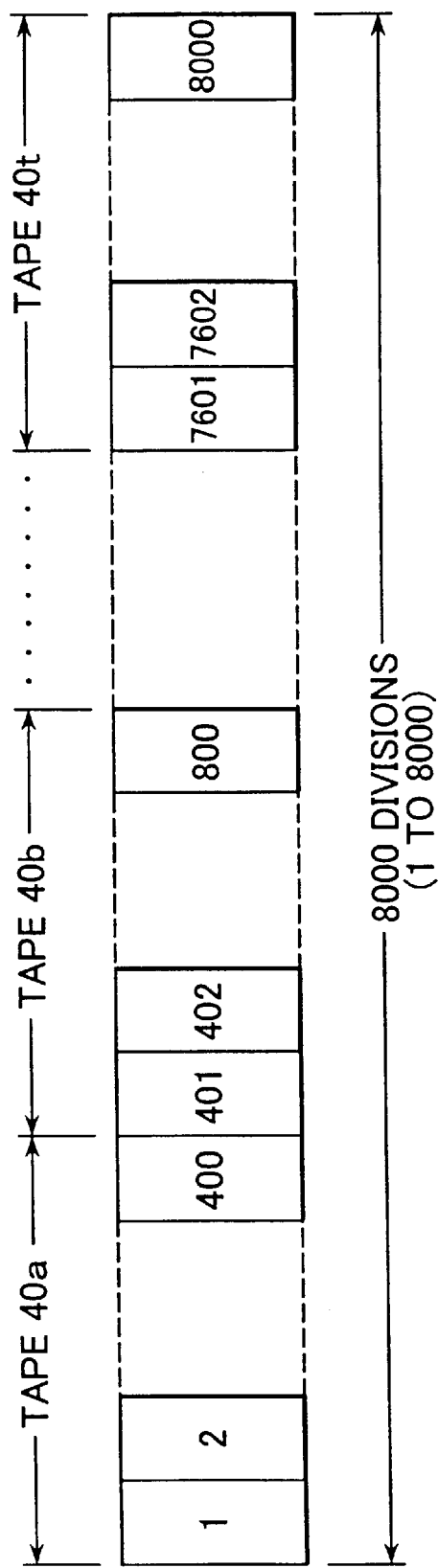
FIG. 9 is a diagram for illustrating an example of the constitution of a division.

In the data storage device 1, all divisions, which are formed onto the individual magnetic tapes of the twenty tape cassettes, are managed as a continuously formed recording area. Hence, the division Nos. recognized by the data storage device 1 are represented by reference numerals #1 to #8000, as serial Nos. corresponding to 8000 divisions (400 divisions×20 tape cassettes) which are formed onto all magnetic tapes. That is, FIG. 9 shows the magnetic tape having the 8000 divisions of #1 to #8000 as an example. As shown in the figure, in the data storage device 1, magnetic tapes 40*a* to 40*t* are handled to be regarded as a single magnetic tape. Therefore, as described earlier, if the storage capacity of the single magnetic tape 40 wound in the respective tape cassettes is, e.g., 500 GB (giga byte), the data storage device 1 comprises a tape-shaped recording medium having a storage capacity of 1 TB (tera byte). If a transfer rate of video data is, e.g., 6 Mbps, the data storage device 1 can record the vide data corresponding to approximately 370 hours. Then, upon using the magnetic tape as a simple expression in the following, it is assumed that the magnetic tapes 40*a* to 40*t* are indicated as a single magnetic tape.

With such a division structure, in the case of reading out data recorded to, e.g., the division No. #6801, the controller 11 in the data storage device 1 issues the changer unit 5 to an instruction to load a tape cassette #R to the tape drive unit 4 and, further, issues the tape drive unit 4 to an instruction to access a second division of the magnetic tape 40*r*. Thereby, it is possible to read out the data recorded to the division No. #6801 from the tape drive unit 4.

1-7. Hard disk unit

Figure 10:
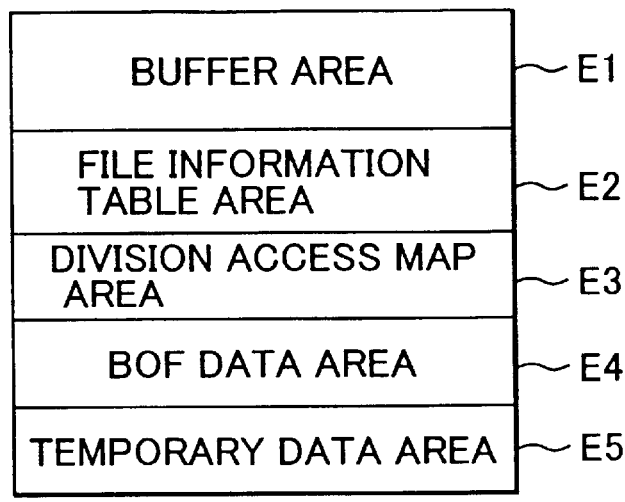
FIG. 10 is a diagram for illustrating one example of a recording area which is formed to the hard disk unit.

FIG. 10 is a diagram for illustrating an example of the constitution of a recording area which is formed in the hard disk unit 3 included in the data storage unit 1.

A buffer area E1 functions as a buffering area in the case of recording by the data storage device 1, data to be transferred from the computer device 41 and in the case of transferring data, which is read out from the tape drive unit 4, from the data storage device 1 to the computer device 41.

A file information table area E2 functions as a table area which stores therein management information on a file (for instance, as a video data unit of a movie), etc. which are recorded in the data storage device 1.

A division access map E3 functions as an area which stores therein information such as a use status of the divisions #1 to #8000 formed onto the magnetic tape 40.

ABOF (Beginning of File) area E4 functions as, for example, an area in which the head portion of the file is recorded as beginning of file data (BOF data). When reading out the file, first, the BOF data is read out and, then, the tape drive unit 4 can access a required division of the magnetic tape 40 during transferring the BOF data to the computer device 41. Thus, reproduction of data can be executed almost in real time, without influence of access operation of the magnetic tape 40 that takes a relatively long time, in accordance with a "reproduce command" supplied by the computer device 41.

After accessing the required division of the magnetic tape 40 in the tape drive unit 4, in place of the BOF data, the data read out from the magnetic tape 40 is transferred to the computer device 41.

A temporary data area E5 functions as an area in which temporary data necessary during a period for exchanging the tape cassette is recorded, when one file might be recorded to be sectioned over a plurality of magnetic tapes. Thus, even if the exchange of the tape cassette might be necessitated during reproducing, for example, one file, the temporary data is read out and is transferred to the computer device 41 while the changer unit 5 exchanges the tape cassette. This enables the data to be continuously reproduced in real time without interruption.

Figure 11:
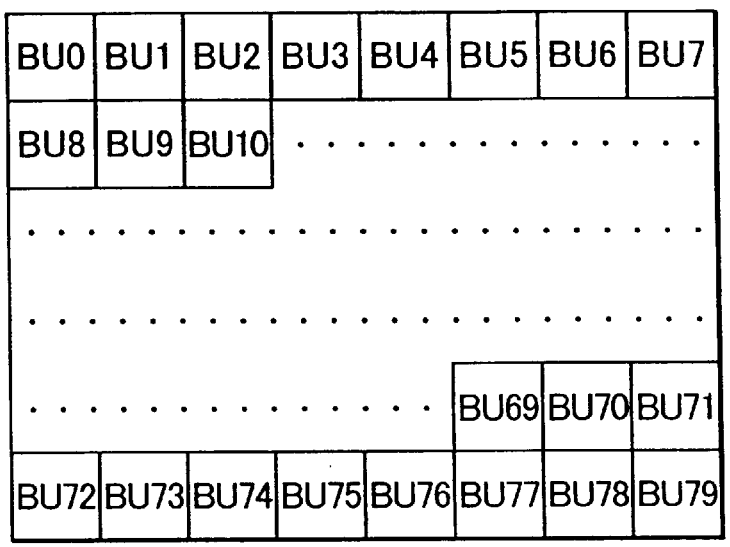
FIG. 11 is a diagram for illustrating a buffer area.

FIG. 11 is a diagram for illuminating an example of the constitution of the buffer area E1.

The buffer area E1 comprises areas BU0 to BU79 corresponding to the capacity of one division formed onto the magnetic tape 40. That is, the buffer area R1 can store therein data corresponding to 80 divisions. When the area BU is 125 MB, the buffer area E1 has a capacity of 10 GB (gigabytes). In this case, premising, e.g., an MPEG2 and converting it into time, video data corresponding to about two hours can be buffered. With respect to the capacity of the buffer area E1, upon recording data, premising that, for instance, the buffer area E1 is unused, data to be transferred to the data storage device 1 from the computer device 41 is buffered to the area BU0, area BU1, area BU2, . . . depending on the capacity corresponding to the division. When storing all data of a file recorded to the buffer area E1, the buffering operation ends at this time. Then, the data is transferred to the tape drive unit 4 from the buffer area E1 at a required timing as needed, during buffering.

As described above, the recording is performed by using the buffer area E1. Thereby, the data transferred from the computer device 41 can be stored in the buffer area E1 in real time even if the tape cassette must be exchanged by the changed unit 5 during recording of, e.g., one file and then the recording to the magnetic tape might be temporarily interrupted. After finishing the exchange of the tape cassette, in the buffer area E1, data just before interruption of recording is read out from the area BU and is stored in the magnetic tape 40. Thereby, data can be recorded to the magnetic tape in real time.

Also, when reproducing the recorded data, the head portion of the file stored in the buffer area E1 can be read out and then can be transferred to the computer device 41 while the tape drive unit 4 and the changer unit 5 access the magnetic tape 40.

If the capacity of the file to be transferred to the data storage device 1 from the computer device 41 is larger than the buffer area E1, after completion of buffering operation using the area BU0, area BU2, . . . , area BU79, data to be sequentially transferred is buffered to overwrite the area BU0, area BU1, area BU2, . . . . In other words, irrespective of the capacity of the data transferred from the computer device 41, the buffering operation continues during recording of the file.

Although a part corresponding to the head of the file is erased, the beginning of file data corresponding to the file may be stored in beginning of file data area as needed. When overwriting data of the buffer area E1, data recorded to the division to be overwritten is recorded to the magnetic tape 40.

FIG. 12 is a diagram for illuminating an example of the constitution of a file information table area E2.

Various information for each file to be recorded to the data storage device 1 is recorded to the file information table area E2.

For example, a file ID as identifier information of the file is information for selecting a specific file when the data storage device 1 reproduces and updates the file.

Attribute information is formed by storage level and reproduction rate of the file. Based on information recorded to the file information table area E2, which will be described hereinbelow, the storage level of the file becomes information indicating a state of the file. Also, the reproduction rate becomes information indicating a transfer rate of the data.

Information of the number of access times indicates the number of access time to the corresponding file, and is incremented, for example, every reproduction of the corresponding file.

Information of end time of writing becomes information indicating the time at which recording of the file ends.

Information of final access date becomes information indicating year, month, day, and time of final access of the corresponding file.

Start division number indicates the corresponding file is started from which division of the magnetic tape 40. In the present embodiment, any one of division Nos. #1 to #8000 is indicated.

File size information indicates a recording capacity of the corresponding file.

As described above, the information on the file recorded to the data storage device 1 is recorded to the file information table area E2. The storage level is set based on the attribute information, information of the number of access times, information of the end time of writing, information of final access date, information of start division number, and file size information, etc.

FIG. 13 is a diagram for illuminating an example of the constitution of a division access map E3.

The division access map E3 indicates a use status of the respective divisions corresponding to the files recorded to the magnetic tape 40. That is, the data storage device 1 can grasp the use status of the respective divisions by a situation code corresponding to the division.

When "0002" is indicated corresponding to the division #1 as the situation code, this indicates that data subsequent to the division #1 is stored in the division #2. That is, this also indicates the order of recording data. Therefore, when reproducing the file, the division number corresponding to the head of the file to be reproduced is designated by the information of the number of start divisions shown in the file information table area E2 on the basis of an instruction from the computer device 41. After that, a desired division can be accessed by referring to the division access map E3.

"FFFFh" as the situation code indicates that the corresponding division is a final division of the file. In other words, in the division access map E3, the situation code "FFFFh" corresponding to the number of recorded files exists.

The example in FIG. 13 indicates that data comprising a certain file is recorded in the order of (division 5, division 6, division 7, division 1, division 2, and division 3).

When the division is unused, the situation code indicates "0000h" and this indicates the division corresponding to a space area or a blank area that the division is not used at present. The space area indicates an unused area that although the file was recorded, the recorded data is erased at the present. The blank area is an area where the file was not recorded in the magnetic tape 40. If the division is recorded from the head of the magnetic tape 40, the black area indicates a continuous unused-area from an end division in which the recording has already been performed or an end division of the final space area to an end division in a recordable area in the magnetic tape 40. Therefore, if the division, to which the data has been recorded once, is erased and then becomes the unused area, the division is not handled as the blank area.

In the present embodiment, the divisions Nos. #1 to #8000 are formed as information of the individual divisions. An offset amount, for example, up to the blank area is represented as the division No. #0 in the division access map E3. If the tape drive unit 4 accesses the blank area, the blank area is searched based on contents shown by the situation code of the division No. "0" in the division access map E3.

Since the blank area is used when the size of the recorded file is known and thus the section of the files is suppressed and the magnetic tape 40 is averagely used as will be described later, the space area is handled independently of the blank area as mentioned above.

The access map E3 manages the use status of the all divisions. Therefore, when an instruction for recording or reproduction, etc. is issued to the data storage device 1 from the computer device 41, the use status of the division can be grasped by referring to the television access map E3 before the tape drive unit 4 actually accesses the magnetic tape 40.

1-8. Size of Division Corresponding to Section

Then, premising that video data of a relatively large capacity such as a movie is recorded or reproduced by using the data storage device 1, the recording and reproduction of the data needs a real time manner.

Therefore, when one file is sectioned, for example, the reproduction of a first section is finished and, then, the section shifts to a second section, a third section, . . . . After transition, the reproduction starts again.

Figure 14A:
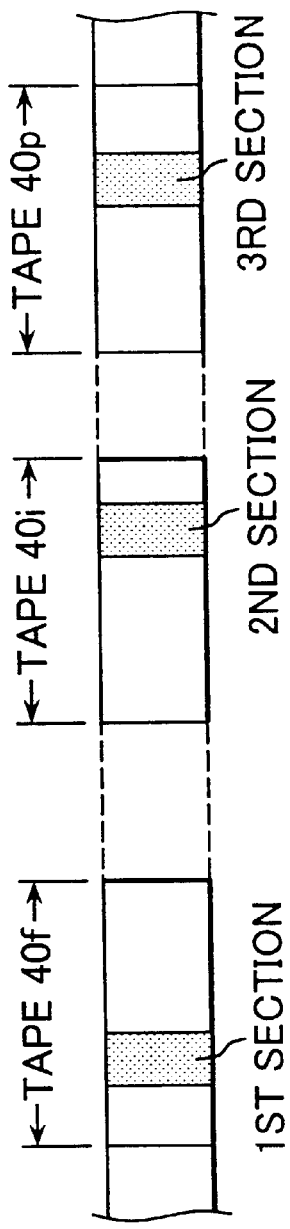
FIGS. 14A to 14C are diagrams for illustrating section of the file on the magnetic tape.
Figure 14B:
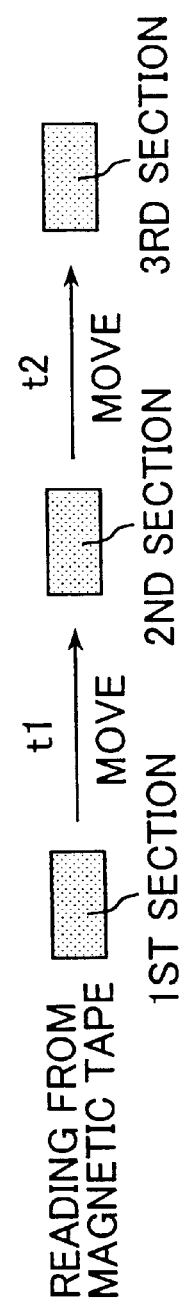
Figure 14C:

FIGS. 14A to 14C are schematic diagrams showing examples in the case of reproducing a sectioned file. Incidentally, the second section exists in the magnetic tape of the same tape cassette or in the magnetic tape of another tape cassette which is disposed in the rack means of the changer unit 5. These figures exemplify the latter.

As shown in FIG. 14A, one file is sectioned and, then, a first section is recorded to the magnetic tape 40$f$, a second section is recorded to the magnetic tape 401, and a third section is recorded to the magnetic tape 40$p$. In the case of reproducing the file sectioned throughout a plurality of magnetic tapes as mentioned above, first, the changer unit 5 exchanges the tape cassette. Further, the tape drive unit 4 accesses the division to which the section is recorded by fast forward operation, etc. As shown in FIG. 14B, according to this transition, after the first section is read out from the magnetic tape 40$f$, with the passage of a movement time t1 from the first section to the second section (namely, operation times of the changer unit 5 and the tape drive unit 4), and the second section is read out from the magnetic tape 401. The reading operation of the second section ends, thereafter, with the passing of the movement time t2, and the third section is read out from the magnetic tape 40$p$.

According to the transition shown in FIG. 14B, data (section) read by the magnetic tape 40 is temporarily stored in the buffer area E1 of the hard disk unit 3 as mentioned above. The data is read out from the buffer area E1 and is transferred to the computer device 41. However, in this case, a speed of reproducing the data read from the magnetic tape 40 by the computer device 41 is lower than a speed of reading out the data from the magnetic tape 40. Therefore, a time lag is caused between the reading time and the reproducing time. As a reproduced vide image, the respective sections are coupled as shown in FIG. 14C and a video image in real time is continuously formed.

Also, in the case of moving from the first section to the second section, by successively transferring to the computer device 41, the data which is read out by the tape drive unit 4 and is stored in the buffer area E1 of the hard disk unit 3, the data can be continuously reproduced in real time manner.

Hence, in order to ensure the reproduction of data in real time, the following condition may be satisfied.

(Time of reading data from the magnetic tape−time of reproducing the video image)≧(Time of movement to the section) That is, data corresponding to a capacity equal to or more than a time necessary for movement between the sections may be stored in the area BU of the buffer area E1.

If the size of the division is set to 128 MB, a reproduction time of video data having, e.g., 6 Mbps as the MPEG2 is given bellow.

$$128 \times 8/6 = 171 \text{ sec}$$

Premise that a transfer rate of data read by the magnetic tape 40 is, e.g., 48 Mbps in the tape drive unit 4, this is converted into a reproduction time and, then, the following equation is obtained.

$$128 \times 8/48 = 21 \text{ sec}$$

In other words, the data requiring 171 sec as the reproduction time can be read out in the tape drive unit 4 for 21 sec. Therefore, 150 sec serving as a difference can be used as the movement time between the sections.

As mentioned above, the data storage device 1 uses the buffer area E1 formed to the hard disk unit 4 as buffer means, thereby recording or reproducing the data to the magnetic tape 40. That is, the data storage device 1 is constructed as a recording and reproducing apparatus capable of high-speed access to the hard disk unit 4 with a large capacity of the magnetic tape 40. Therefore, it is also suitable to record and reproduce the video data requiring a large capacity in real time.

2. File System 2-1. Example of Structure of Host Computer Device

The computer device 41 recognizes the data storage device 1 as a random access device such as a hard disk device. However, actually, the data storage device 1 is constructed as a tape streamer drive device having a plurality of tape cassettes, thereby executing the recording and reproducing operation through sequential access. Then, a driver unit for driving the data storage device 1 (recording and reproducing) converts a random access command, which is issued by the application program or file system in the computer device 41, into a sequential access command. That is, for the computer device 41, the data storage device 1 can be handled as a random access device similar to the hard disk device, etc.

Figure 15:
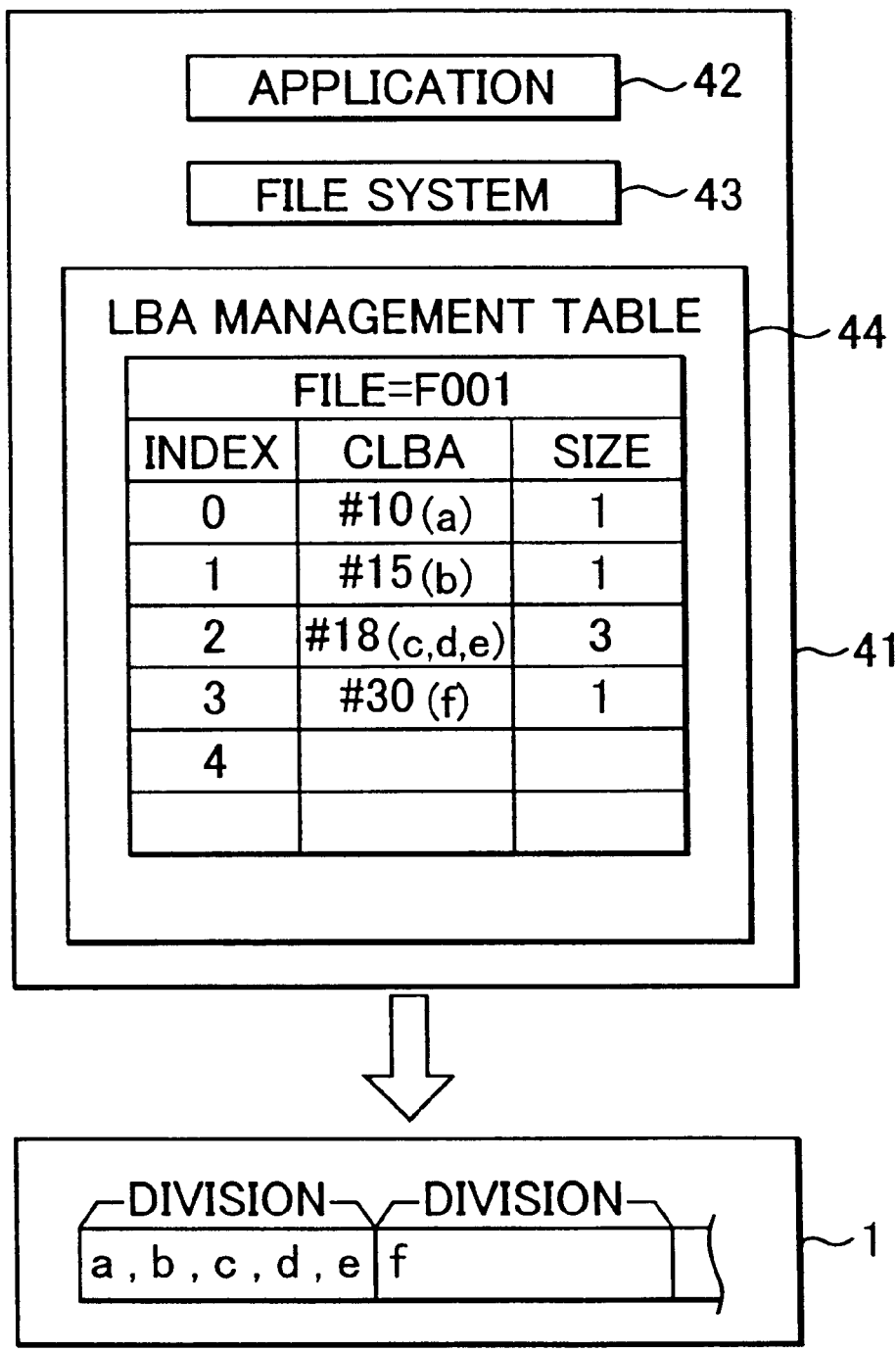
FIG. 15 is a diagram for illustrating a driver unit in the computer device.

FIG. 15 is a diagram for illustrating an example of the structure of the computer device 41 when operation of the data storage device 1 is executed.

As shown in the figure, the computer device 41 comprises: application software 42 serving as software for executing the recording and reproducing image data, etc. on a file unit basis by a user; and an operation/file system 43 (hereinlater, referred to as a file system) for executing the recording and reproduction of data by designating an LBA (Logical Block Address) of a cluster (e.g., 64 KB) as a unit upon recording and reproducing the data to the hard disk. By employing the application software 42 and the file system 43, a random access device such as a hard disk device can execute the recording and reproduction of data through random access.

Then, in the present embodiment, in addition to the application software 42 and the file system 43, the data storage device 1 has the driver unit 44 serving as software for executing the recording and reproduction, etc. The driver unit 44 has an LBA management table for converting random access into sequential access.

Stored in the LBA management table, is various information corresponding to each file which is recorded to the data storage device 1. FIG. 15 shows information corresponding to a file "F001" as an example. Index information indicates a sequential value in the LBA management table. CLBA information indicates an address assigned on a cluster unit basis and size information indicates the number of clusters corresponding to the address of the CLBA information.

When a write command for the random access is supplied from the file system 43, first, the driver unit 44 notifies the data storage device 1 of a file name. With a corresponding relationship between the order of the write command corresponding to the file to be read and the LBA information at this time, the driver unit 44 stores the corresponding information as the index information and the CLBA information in the LBA management table. Also, the driver unit 44 stores information "F001" as file ID information to specify a table corresponding to the file.

In the example shown in FIG. 15, a cluster and a size of index information "0" are "#10" and "1"respectively. Clusters of index information "1" and "3" are "#15" and "#18"respectively. Sizes of the index information "1" and "3" are "1". A cluster and a size of index information "2" are "#18" and "3" respectively.

The driver unit 44 stores the a fore mentioned information in the LBA management table corresponding to the write command to be supplied from the file system 33 and, further, sequentially transmits the write commands to the data storage device 1 in the sequence indicated by the index information. For example, if CLBA information #10 and #15 are "a" and "b", respectively, and CLBA information #18 is "c", "d", and "e", the driver unit 44 records the files to the magnetic tape 40 in the sequence of "a", "b", "c", "d", "e", and "f".

Figure 16:
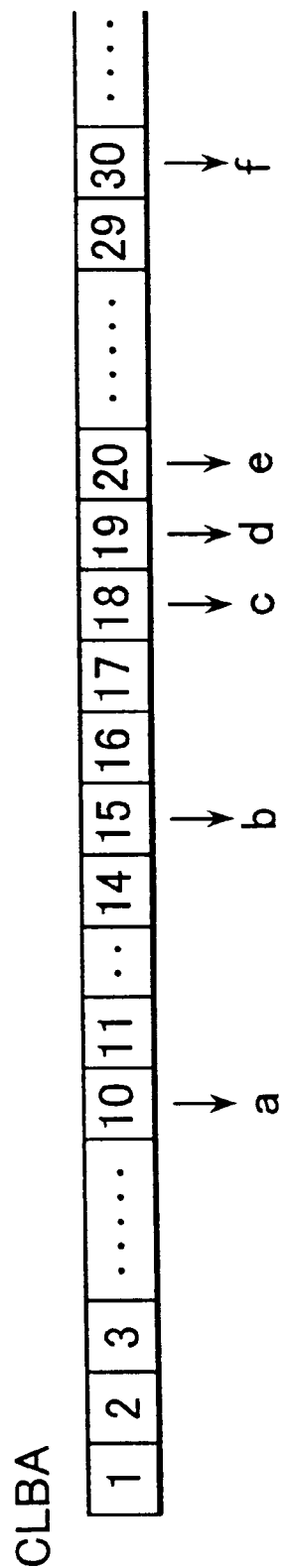
FIG. 16 is a schematic diagram for illustrating an address of a cluster.

FIG. 16 shows the CLBA information corresponding to the file "F001" in the LBA management table when the data is recorded to the magnetic tape 40 in the above-described manner. As shown in FIG. 16, the CLBA information corresponding to the file "F001" has a random alignment. By managing only the CLBA information (a, b, c, d, e, f) in the LBA management table corresponding to the file "F001", these data can be handled as sequential data.

In other words, the information recorded to the LBA management table of the driver unit 44 corresponds to the sequence of data constituting the file to be recorded to the data storage device 1. Hence, if the file system 43 supplies a read command based on the random access to read out the file "F001" from the data storage device 1, the driver unit 44 can specify by which write command the LBA requested by the file system 43 corresponds to data recorded, in the case of recording the file "F001". After the file is recorded to the data storage device 1, each information on the file is recorded to the foregoing file information table E2.

Figure 17:
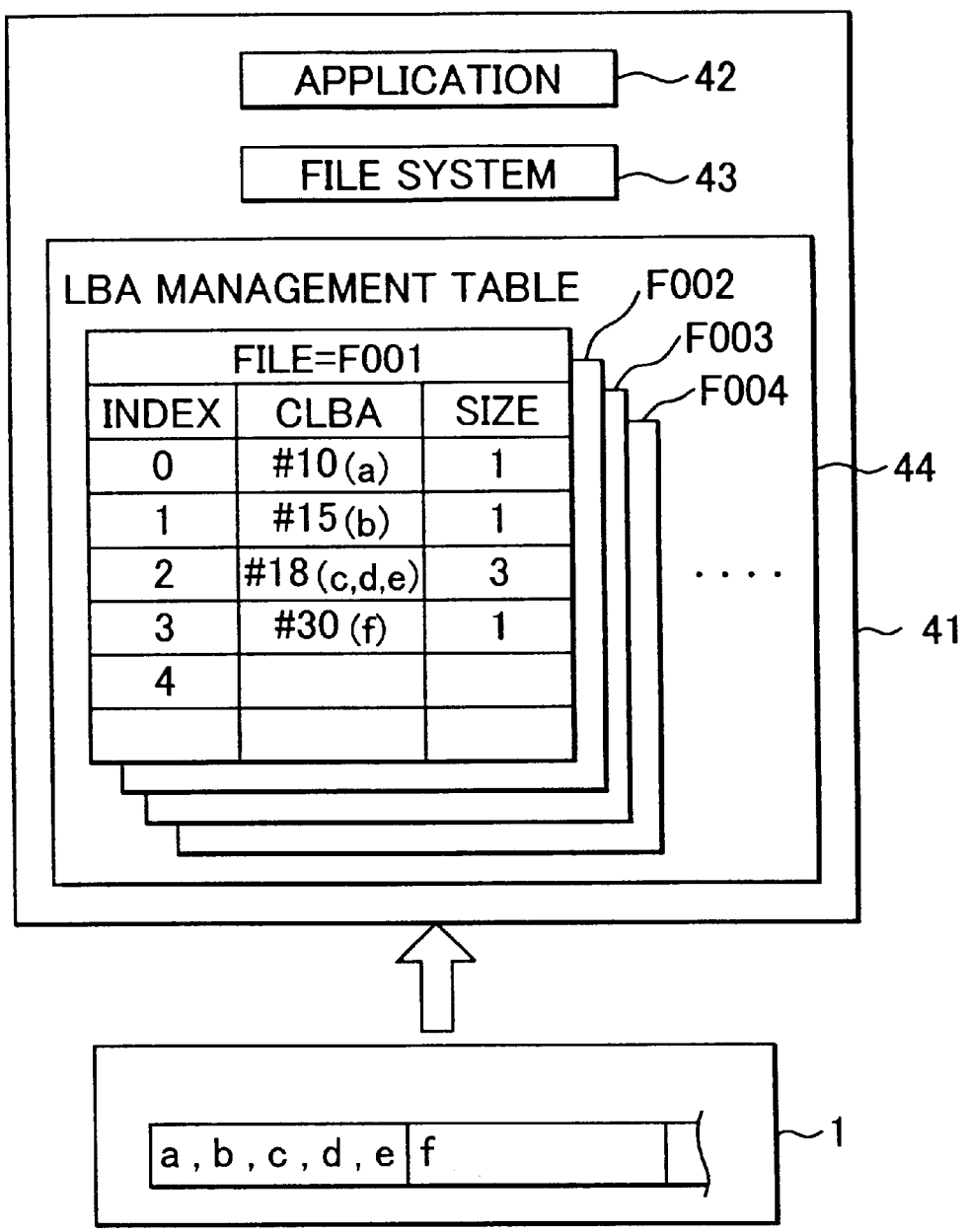
FIG. 17 is a diagram for illustrating the driver unit in the computer device.

The data storage device 1 reads data on a file unit basis and, therefore, information corresponding to the respective files are recorded to the LBA management table, as shown by the files "F001", "F002", "F003", "F004", . . . , which are recorded to the data storage device 1, in FIG. 17. Therefore, if executing the reproduction of the files recorded to the data storage device 1, the driver unit 44 first transmits file ID information to the data storage device 1. Thereafter, the driver unit 44 transmits the sequential read command. If the file "F001" is reproduced, read commands #10, #15, #18, and #30 are transmitted and, then, the data storage device 1 reads out data in the sequence of "a", "b", "c", "d", "e", and "f" which is recorded to the magnetic tape 40.

2-2. Example of Command Outputted by Driver Unit

In order to realize the sequential recording and reproduction to the data storage device 1 on the file unit basis as mentioned above, the driver unit 44 defines, for instance, an SCSI command, which will be described herein below. Incidentally, reference symbol "N" corresponds to a file ID and also corresponds to "F0001", "F002", "F003" and "F004", etc.

Create File #N: Start to write a new file
Close File #N: End writing and reading
Open File #N: Start to read a recorded file
Delete File #N: Erase recorded data
Send Real time Speed (in Mbps): Notify a reproduction rate to ensure a real time manner
Set Real time Mode ON: Set a Real time Mode to ON
Space: Fast forward 2-3. Process on Computer Device FIG. 18 is a diagram for illuminating a transition of processes which are executed on the computer device 41 side based on the various commands when the data storage device 1 executes the recording of data.

To start with, the application 42 issues a write command "Write File "F001" for executing the recording of the file #F001. In this case, the application 42 issues a command based on, for example, user's requiring operation. The application 42 issues the write command and, then, the file system 43 issues the write command which designates the LBA on the cluster unit.

The driver unit 44, to which the write command is supplied by the file system 43, first outputs the "Create File #F001"command to start a new file to the data storage device 1. Incidentally, the driver unit 44 also outputs the "Send Real time Speed" command to ensure the seriality of recorded data as needed. Subsequently thereto, the driver unit 44 outputs the write command on an LB (Logical Block) unit.

Also, the driver unit 44 sequentially writes the LBA to be supplied by the file system 43 to the LBA management table. More specifically, after issuing the "Create File #F001" command, recording data is sequentially transferred to the data storage device 1 and the logical block LB of the data transferred to the data storage device 1 is recorded to the LBA management table.

In the end of recording, the driver unit 44 issues the "Create file #F001" command to the data storage device 1. Thus, the data storage device 1 ends the recording operation of the data.

As described above, when the data storage device 1 executes the recording, the driver unit 44 designates the file and issues to the data storage device 1, the "Create File #F001" command for instructing the start of recording and the "Close File "F001" command for instructing the end of recording. The LBA management table in the driver unit 44 manages processing steps of recording data from the start to the end of the recording.

FIG. 19 is a diagram for illustrating the transition of processes to be executed on the computer device 41 side based on the above various commands, when the data storage device 1 executes the reproduction of data. Incidentally, FIG. 19 exemplifies a case where in the file #F001 is reproduced, starting with the head the file #F001.

The application 42 issues the "Read File #F001" command for executing the reproduction of the file #F001 and, then, the file system 43 issues the read command which designates the LBA (#10) on the cluster unit basis.

The driver unit 44, to which the read command is supplied by the file system 43, first outputs to the data storage device 1, the "Open File #F001" command for starting the reading operation of the file. Thereby, the data storage device 1 refers to the file information table area E2 and executes, for example, an operation for accessing and reading out the file #F001 recorded to the magnetic tape 40. Subsequently thereto, the driver unit 44 outputs the read command on the LB unit basis. If ending the reading operation, the driver unit 44 issues the "Close File #F001" command to the data storage device 1.

If the reproduction is executed starting with data in the middle of the file #F001, this case is shown in FIG. 20 as an example.

In this case as well, the application 42 issues the read command "Read File #F001" for executing the reading operation of the file #F001 and, then, issues a read command which designates a CLBA (#15) on the cluster unit basis.

The driver unit 44, to which the read command is supplied by the file system 43, first outputs to the data storage device 1, the "Open File #F001" command for starting the reading operation of the file. Further, the driver unit 44 outputs the "Set Real time Mode ON" command to realize real time reproduction.

Thereby, the data storage device 1 recognizes the file to be reproduced, thus shifting to a reproduction-executable state. After accessing the head of the file #F001, the data storage device 1 issues the "Space" command to execute the reproduction of data starting with the data "b" in the middle of the file #F001 (the CLBA information #15 in the LBA management table), thereby fast forwarding the magnetic tape 40 up to the data "b". Thereafter, in a manner alike to the above-described case, the driver unit 44 outputs the read command on the LB unit basis and issues the "Close File #F001" command upon ending the reproduction.

FIG. 21 is a flowchart showing steps in processes on the computer device 41 side when the data storage device 1 executes the recording operation of data as shown in FIG. 18.

First of all, the application 42 requests the execution for recording data of the file system 43 in step S001. When the request for the execution of writing data is received, the file system 43 issues the write LBA through the random access to the driver unit 44 in step S002. The driver unit 44 sequentially registers LBA to be supplied by the file system 43 to the LBA management table in step S003. Further, the driver unit 44 issues the sequential write command to the data storage device 1 in step S004.

As a consequence, the data storage device 1 can record the data transferred by the computer device 41 through the sequential access.

Figure 22:
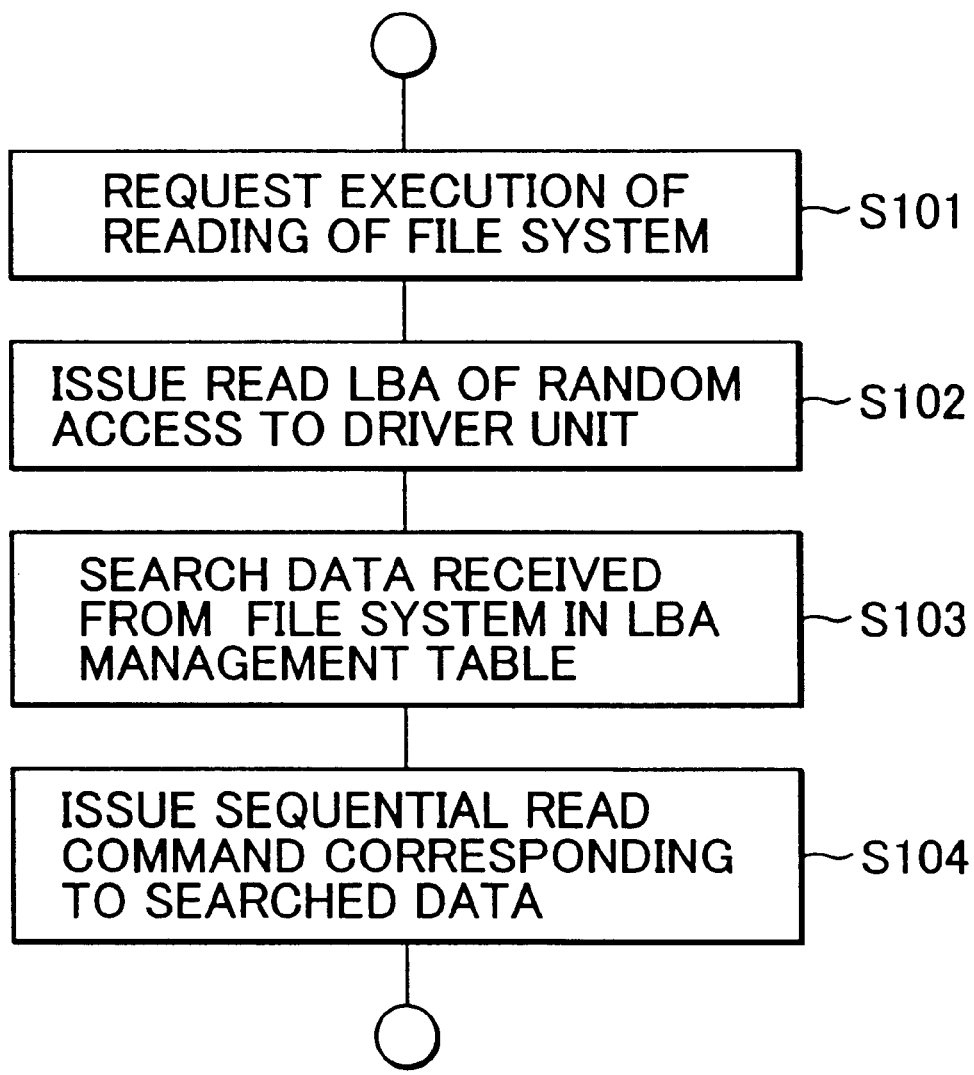
FIG. 22 is a flowchart for illustrating processing steps on the computer device upon reproducing the data.

FIG. 22 is a flowchart showing steps in processes on the computer device 41 side when executing the reproduction of data which is recorded to the data storage device 1 as shown in FIGS. 19 and 20.

The application 42 requests the execution of reproduction of data in step S101 of the file system 43. Then, the file system 43 issues a read LBA through random access to the driver unit 44 in step S102. The driver unit 44 searches the CLBA information, which is recorded to the LBA management table corresponding to the file #F001 to be read out on the basis of the LBA supplied by the file system 43, and also searches data to be read out in step S103. Further, the driver unit 44 issues to the data storage device 1, a sequential read command corresponding to the data to be read out in step S104.

As explained above, the computer device 41 has the driver unit 44. The driver unit 44 converts the random access command into a sequential access command. Thus, the data storage device 1 can implement the recording or reproduction of data through the sequential access.

2-4. Processes on Data Storage Device

The data storage device 1 can implement the recording or reproduction based on the sequential access command which is sent by the driver unit 44 in the computer device 41.

Figure 23:
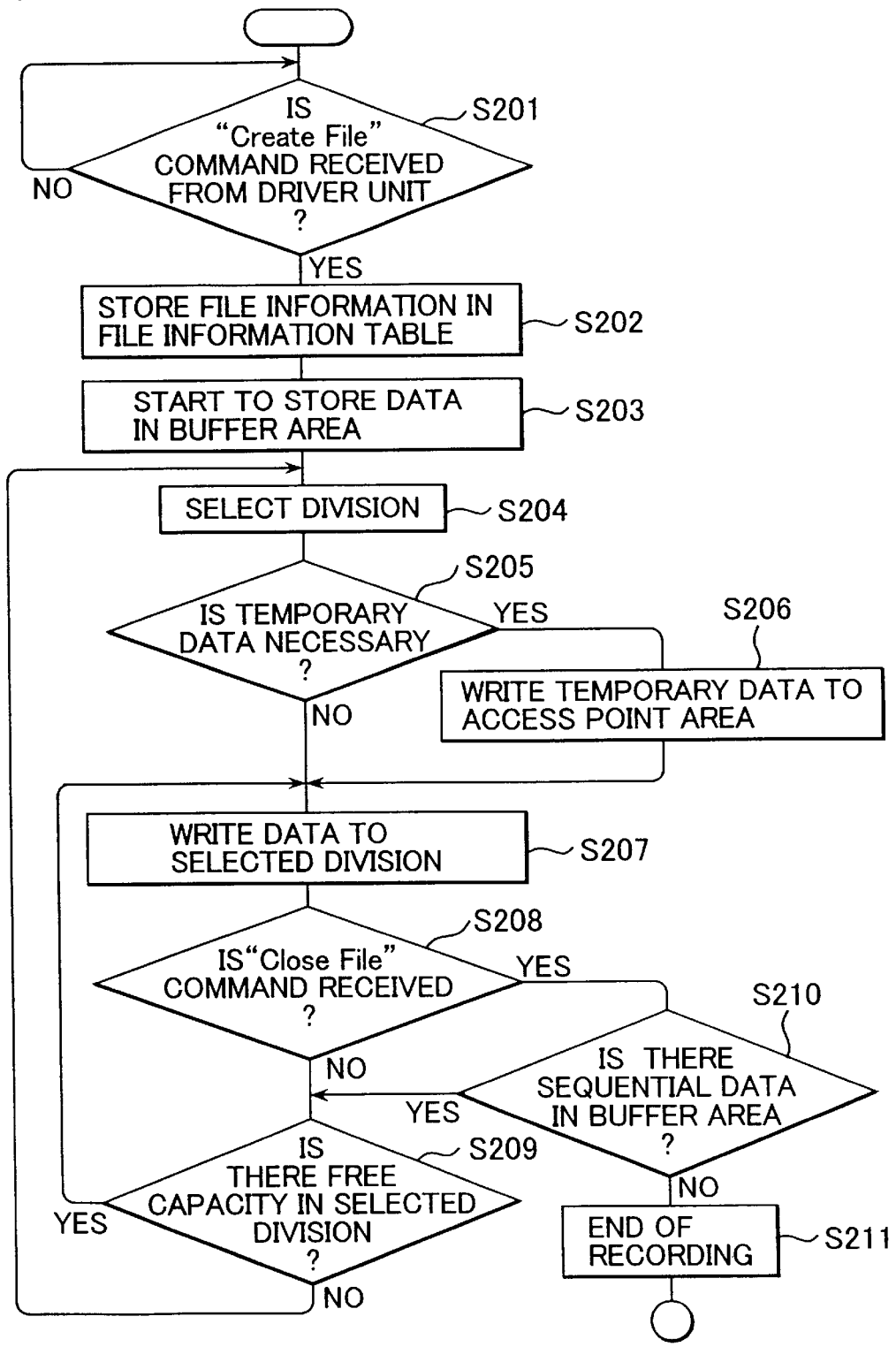
FIG. 23 is a flowchart for illustrating processing steps on the data storage device upon recording the data.

FIG. 23 is a flowchart for illustrating one example of steps in processes executed by, e.g., the controller 11 when the data transferred by the computer device 41 is recorded to the magnetic tape 40 in the data storage device 1.

The data storage device 1 enters an operating state and, then, the controller 11 waits for a command from the driver unit 44 in step S201. If it is determined that the driver unit 44 supplies the "Create File" command for instructing the start of data recording, necessary information is stored in the file information table E2 (refer to FIG. 12) in step S202. And, the data transferred by the computer device 41 is stored in the buffer area E1 (refer to FIG. 11) in step S203.

The division for recording the data is selected on the magnetic tape 40 in step S204. Here, it is determined whether or not temporary data is necessary in step S205. If it is determined that the temporary data is necessary, required temporary data is recorded to temporary data area E5 in step S206.

Through the processing steps of the temporary data as mentioned above in step S207, the controller 11 shifts to processes for recording the data stored in the buffer area E1 to the division on the magnetic tape 40 which is selected in step S203. More specifically, in step S207, first of all, the changer unit 5 selects the tape cassette and the controller 11 controls operation that the tape drive unit 4 moves to a predetermined division in the selected tape cassette. After that, the recording operation is implemented.

In the processes for recording the data, the controller 11 determines whether or not the "Close File" command for instructing the end of recording is supplied by the driver unit 44 in step S208. If the controller 11 determines that the "Close File" command is not supplied, the recording is continuously carried out. In this case, it is determined whether or not there is a free area in the selected division in step S209. If it is determined that there is a free area, the processing routine returns to step S207, whereupon the recording operation continues. However, if it is determined that there is no free area, the processing routine returns to step S204, whereupon the division is selected and the recording operation continues.

If it is determined that the "Close File" command is supplied, it is determined whether or not data to be recorded to the magnetic tape 40 remains in the buffer area E1 in step S210. If it is determined in step S210 that no data remains, it is assumed in step S211 that the recording of the data transferred by the computer device 41 ends and the recording operation ends. However, if it is determined in step S210 that data to be recorded to the magnetic tape 40 remains, the processing routine returns to step S209, whereon the data is recorded based on the capacity of a free area in the selected division.

Then, a description will be given of the processing step of selecting the division shown in step S203 hereinlater.

In the flowchart shown in FIG. 23, the description is given of the flow in the case of recording the data to the magnetic tape 40 via the buffer area E1 in the hard disk unit 3. However, in the cases wherein all of the data transferred by the computer device 41 can be recorded to the buffer area E1, etc., the data recorded to the buffer area E1 might be handled as data recorded to the data storage device 1 and not be recorded to the magnetic tape 40.

Figure 24:
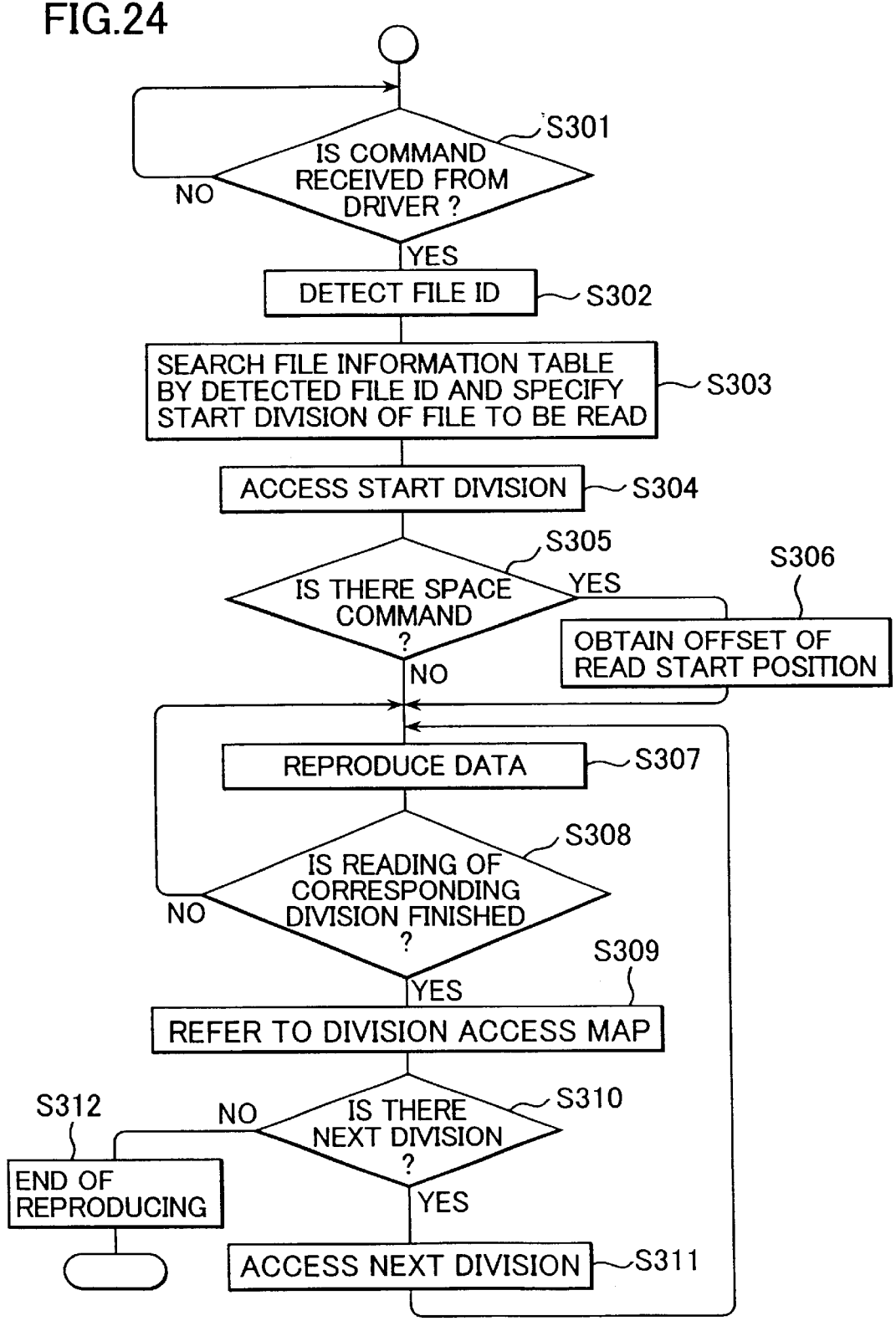
FIG. 24 is a flowchart for illustrating processing steps on the data storage device upon reproducing the data.

Next, a description is given of an example of steps in processes which are executed by, e.g., the controller 11 when reproducing the data recorded to the magnetic tape 40 in the data storage device 1 with reference to a flowchart of FIG. 24.

Similarly to the case described in the flowchart upon recording, the data storage device 1 enters an operating state, and then the controller 11 waits for a command from the driver unit 44 in step S301. If it is determined that the driver unit 44 supplies the "Open File" command for instructing the start of data reproduction, the file ID which is instructed by the "Open File" command is detected in step S302, and the search for the file information table E2 is performed based on the detected file ID and the start division of the file to be reproduced is searched in step S303.

After the start division is specified, first, a process for accessing the start division, namely, the head of the file starts in step S304. In this case, the changer unit 5 selects the tape cassette and the controller 11 controls operation that the tape drive unit 4 moves to a predetermined division in the tape cassette loaded by the changer unit 5. After that, the reading operation from the magnetic tape 40 is implemented. Here, it is determined whether or not the driver unit 44 supplies the "Space" command in step S305. If it is determined in step S305 that the driver unit 44 supplies the "Space" command, that is, if the data is reproduced from the middle of the file, the tape drive unit 4 moves to a position for the start of reproduction in the file, thereby obtaining an offset corresponding to the "Space" command in step S306.

The position for the start of reproduction is specified in step S304 or step S306 and, then, the processing routine advances to reproducing operation for reading out data from the position on the magnetic tape 40 in S307. Incidentally, the data read by the magnetic tape 40 is temporarily stored in the buffer area E1, thereafter, is read out from the buffer area E1, and is transferred to the data storage device 1.

After implementing the reproducing operation of the data as explained above, it is determined whether or not the reading operation of data recorded to the corresponding division ends in step S308. If it is determined in step S308 that the reading operation does not end, the processing routine returns to step S307, whereupon the reading operation of data continues. If it is determined in step S308 that the reading of the data recorded to the corresponding division ends, a division access map E3 in FIG. 13 is referred to in S309. It is determined whether or not there is a next division in which the data of the file is recorded in step S310. If it is determined in step S310 that there is a next division, the division is accessed in step S311. The processing routine returns to step S307, whereupon the data recorded to the next division is continuously read. If it is determined that there is no next division in step S310, the reproducing operation ends in S312.

Incidentally, if the recording data is reproduced subsequently to step S307, the driver unit 44 supplies the "Close" file command for instructing the end of reproduction and, then, the reproducing operation ends.

As explained above, the computer device 41 has the driver unit 44 corresponding to the data storage device 1. In the computer device 41, the driver unit 44 converts the random access command, which is issued by the file system 43 and the application 42, into a sequential access command, and it can output the converted command to the data storage device 1.

The computer device 41 has the driver unit 44 and, thereby, the computer device 41 recognizes the data storage device 1 as a random access device. For example, the data storage device 1 can be handled similarly to external memory devices such as a general hard disk device.

Moreover, individual management is performed for each of the LBAs managed by the file system 43 in the computer device 41 and the files (file information table E2 and division access map E3) in the data storage device 1. By the command conversion by the driver unit 44, the LBA sand the files have a corresponding relationship. Therefore, the file system 43 in the computer device 41, as a random access device, issues a command to the data storage device 1, and the data storage device 1, as a sequential access device, communicates data with the computer device 41. In other words, the data storage device 1 and the computer device 41 need no recognition in steps of the processes for the command conversion by the driver unit 44.

The data storage device 1 can independently determine to which of the hard disk unit 4 and the magnetic tape 40 the data is recorded, not based on an instruction from the file system 43 in the computer device 41. The data storage device 1 can independently record the data with best efficiency.

3. Storage Level of Data 3-1. Recording and Reproduction Routes of BOF Data

When an access distance of the magnetic tape is long, the tape drive unit 4 requires a relatively long access time. Therefore, real time performance of video data might be lost.

Then, the data storage device 1 comprises the hard disk unit 3, as buffer means upon recording, for recording partial data serving as the head portion of the file to a BOF data area E4 as the BOF data having a predetermined capacity upon recording the data.

Figure 25:
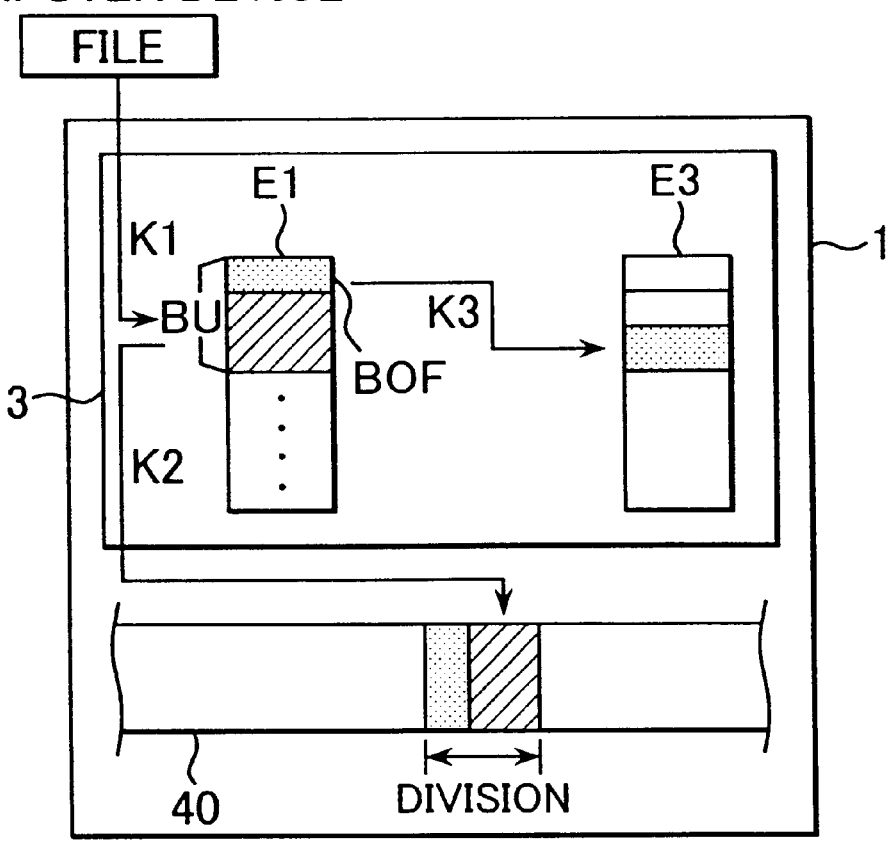
FIG. 25 is a schematic diagram for illustrating a data flow for recording in the data storage device.

FIG. 25 is a schematic diagram for illustrating a route for recording the data transferred by the computer device 41 in the data storage device 1.

As shown by a route K1, the file transferred by the computer device 41 is temporarily stored in a required area BU in the buffer area E1. After that, as shown by a route K2, the stored data is recorded to the division #n in the magnetic tape 40 from the area BU at a required timing. More specifically, the data is stored in the area BU while the tape drive unit 4 accesses the division #n in the magnetic tape 40 (including operation of the changer unit 5).

Further, as shown by a route K3, in the area BU, the BOF data corresponding to the head portion of the file is stored in the BOF data area E4.

Figure 26:
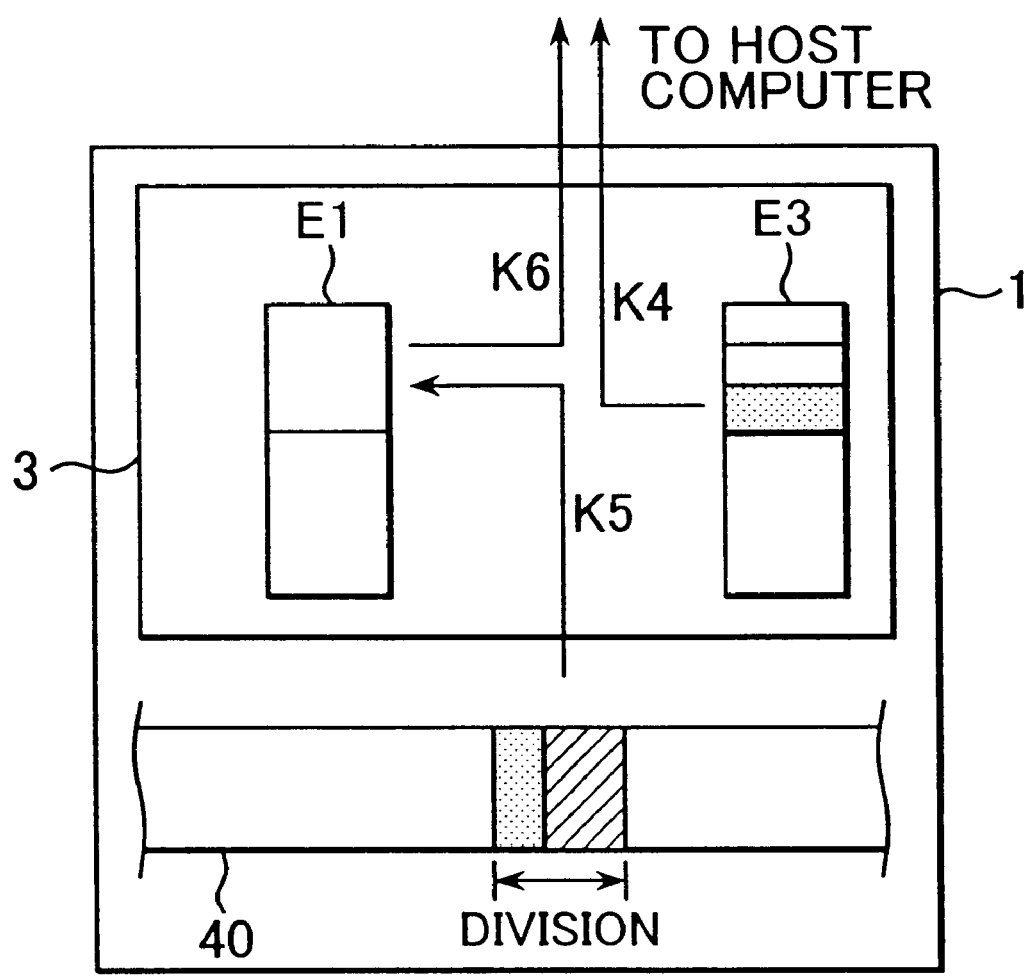
FIG. 26 is a schematic diagram for illustrating a data flow upon reproduction in the data storage device.

The reproduction of the file recorded to the magnetic tape 40 is performed via routes shown in the schematic diagram of FIG. 26.

If the required command (Open File) is supplied by the computer device 41 and it is determined that the reproduction of the file is requested, as shown by a route K4, the data storage device 1 first reads out the BOF data, which is recorded to the BOF data area E4, and transfers the read-out BOF data to the computer device 41. Simultaneously, as shown by a route K5, the data storage device 1 reads out the data recorded to the magnetic tape 40a nd stores the read-out data in the required area BU in the buffer area E1. In other words, the division #n, to which in the magnetic tape 40 the file is recorded, is accessed while the BOF data recorded to the BOF data area E4 is read out and is transferred to the computer device 41, thereby reading the data. After finishing to transfer the BOF data which is recorded to the BOF data area E4, subsequently thereto, the data, which is read out by the magnetic tape 40 and is stored in the buffer area E1, is read out and is transferred to the computer device 41.

As mentioned above, by forming and recording the BOF data, the magnetic tape 40 can be accessed while reading the BOF data and transferring it to the computer device 41. Accordingly, the real time performance for the reproduction data can be maintained.

Assume that, for example, a real time speed of the data transferred by the computer device 41 is V (Mbps) and data size corresponding to a reproduction time of T (sec) is assured, it is capable of expressing the capacity of the BOF data, which is recorded to the BOF data area E4 shown in FIGS. 25 and 26 as follows.

$$VT/8 \text{ (MB)}$$

Therefore, if ensuring a reproduction time of one minute and recording the data transferred by the computer device 41 at a real time speed of 6 Mbps, the following equation is established.

$$6 \times 1 \times 60/8 = 45 \text{ (MB)}$$

Incidentally, if the transfer speed of the data to be transferred by the computer device 41 is not constant, the computer device 41 notifies the data storage device 1 of the real time speed by using the above "Send Real time Speed" before starting the transfer of data. The data storage device 1 records data while assuming that the section, etc. are used, to ensure the continuous reproduction by the reproduction rate which is notified by the command "Send Time Speed"

3-2. Storage Level

In the data storage device 1, the hard disk unit 3 has the buffer area E1 and the BOF data area E4 and can record the data to the magnetic tape 40. Therefore, the files recorded to the data storage device 1 has varied recording formats depending on the file. In the present embodiment, the recording format is a storage level of the file and is defined as shown in FIG. 27.

Factors for determining the storage levels are as follows.

(1) All or one part of the file is recorded to the buffer area E1

(2) The BOF data of the file is recorded to the BOF data area E4

(3) All or one part of the file is recorded onto the magnetic tape 40

, etc.

Based on the those factors, the storage levels are defined: "storage level 7" denotes the file whose data is recorded to the BOF data area E4 and the magnetic tape 40; "storage level 6" denotes the file whose data is recorded to the buffer area E1 and the BOF data area E4; "storage level 3" denotes the file whose data is recorded to the BOF data area E4 and the magnetic tape 40; and "storage level 1" denotes the file whose data is recorded only to the magnetic tape 40. Incidentally, "storage level 0" denotes an initial value of the storage level that there is not the file in the data storage device 1.

The storage level changes depending on the remaining capacity of the buffer area E1, the remaining capacity of the BOF data area E4, and the number of past access times to the corresponding file, and the final access time, etc. in the file information table E2

Based on the storage level, by controlling operation for recording the file to the buffer area E1 or the magnetic tape

40, by controlling operation for recording the BOF data to the BOF data area E3, or by controlling operation for erasing the file recorded to the buffer area E1 and the BOF data recorded to the BOF data area E3, data of the file with high using frequency is selectively recorded to the buffer area E1 and the BOF data area E3.

3-3. Update of storage level 3-3-1. From "storage level 0" to the "storage level 6"

The update of the storage level will be described hereinbelow.

Figure 28:
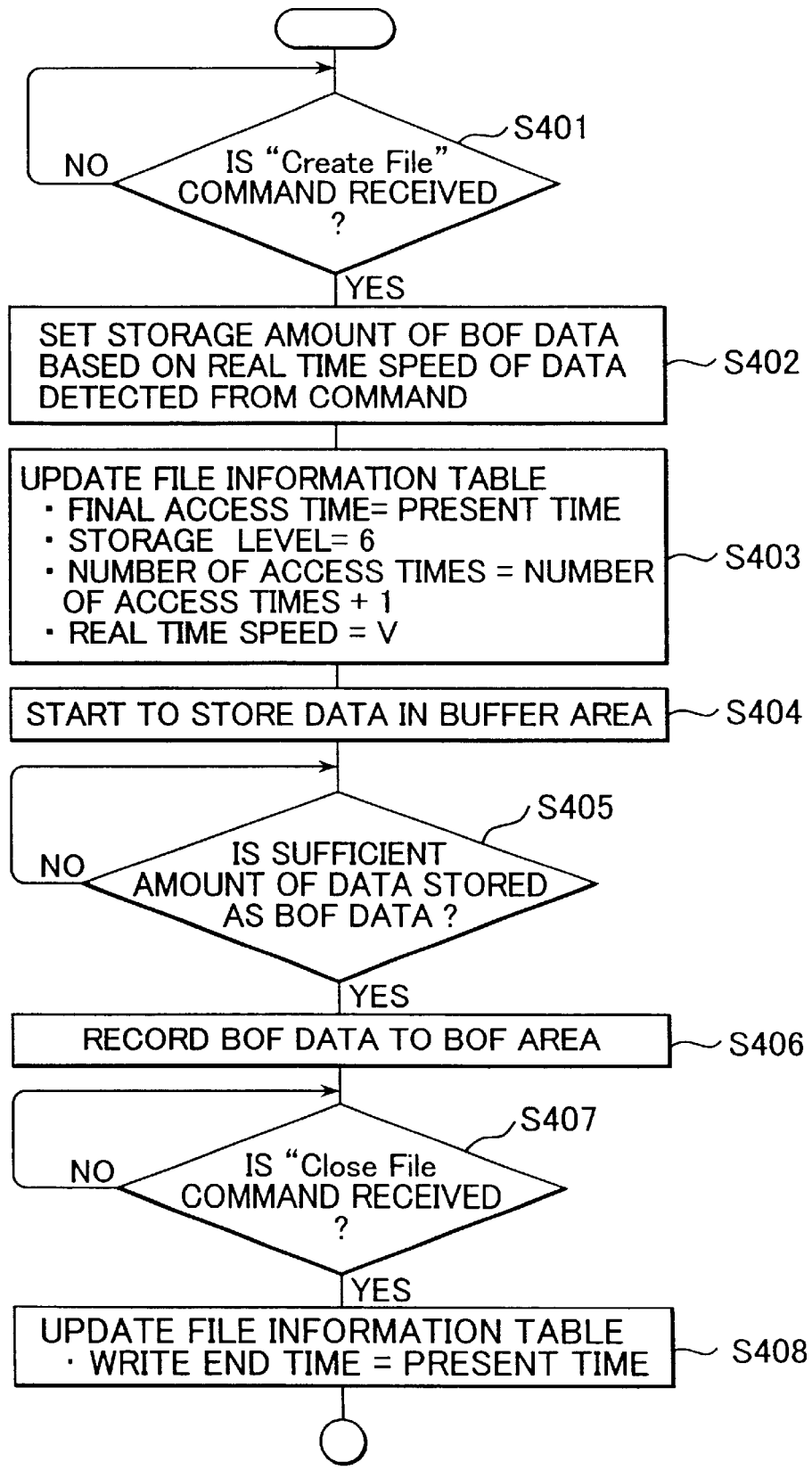
FIG. 28 is a flowchart showing one example in the case of updating (recording) the storage level.

First of all, a description is given of processes for updating the storage level from the storage level "0" to the storage level "6"namely, processes for recording a new file to the data storage device 1 in accordance with the flowchart shown in FIG. 28. Note that it is assumed in the flowchart of the FIG. 28 that all data transferred by the computer device 41 can be stored in the buffer area E1 and the data of the file is not recorded to the magnetic tape 40.

First, it is determined whether or not the driver unit 44 in the computer device 41 sends the "Create File" command for instructing the start of recording in step S401. If it is determined that the "Create File" command is received, the storage capacity of the BOF data is set based on the real time speed which is instructed by the "Send Real time Speed" command which is supplied subsequently to the "Create File" command in step S402. The file information table E2 is updated based on information corresponding to the file to be recorded in step S403. With respect to the updated information in step S403, for instance, the final access time is the present time, the storage level is set to "6" from the initial value "0" the number of access times is incremented, and the real time speed is a speed instructed by the "Send Real time Speed" command.

After updating the file information table E2 as mentioned above, the storage in the buffer area E1 of the data transferred by the computer device 41 is started in step S404. Further, starting to store the data in the buffer area E1, it is determined whether or not a sufficient amount of data as the BOF data is stored in the buffer area E1 in S405. If it is determined that the sufficient amount of data is stored in step S405, the data corresponding to the BOF data is read out from the buffer area E1, and is recorded to the BOF data area E4 in step S406.

After recording the BOF data in the BOF data area E4, it is determined whether or not the "Close File" command for instructing the end of recording is supplied by the computer device 41 in step S407. If it is determined that the "Close File" command is supplied in step S407, the write end time of the file information table E2 is updated to the present time in step S408. Thereafter, the recording operation ends.

In the data storage device 1, when all of the data in the file can be stored in the buffer area E1 as explained above, for example, the file just after recording is managed as the "storage level 6".

3-3-2. From "Storage Level 6" to "Storage Level 7"

The flowchart shown in FIG. 28 exemplifies the case wherein all of the data transferred by the computer device 41 can be stored in the buffer area E1. However, if the remaining recording capacity of the buffer area E1 is relatively smaller as compared with the capacity of the transfer data, the data is recorded to the magnetic tape 40.

Figure 29:
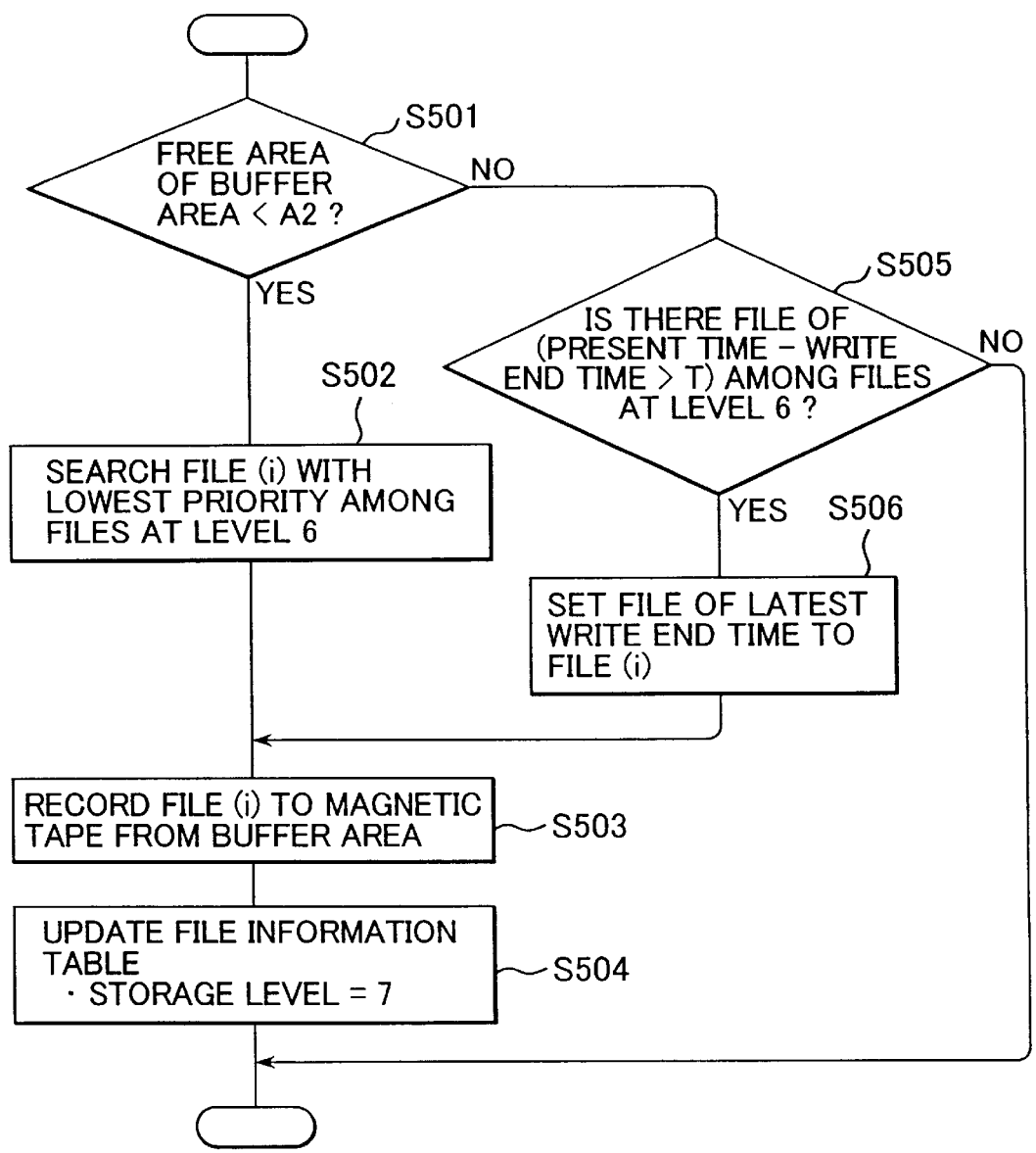
FIG. 29 is a flowchart showing another example in the case of updating (recording) the storage level.

FIG. 29 is a flowchart for illustrating steps in processes for updating the storage level of the file from "6" to "7". Incidentally, the flowchart shown in FIG. 29 indicates processing steps which are arbitrarily performed as the necessity may arise during recording shown in FIG. 28. The relationship among thresholds in processing steps, which will be described later, is given bellow.

0<A1<A2< total number of areas BU in the buffer area E1

Starting to record data in the data storage device 1, it is determined whether or not the number of unused areas BU in the buffer area E1 is smaller than, for instance, a threshold "A2" in step S501. If it is determined that the number of unused areas BU in the buffer area E1 is smaller than the threshold "A2" in step S501, the file (i) with the lowest priority is searched in the files having the "storage level 6" in the file information table E2 in step S502. Herein, the file with the lowest priority is determined under the condition that the number of access times to the file is the smallest as an access history of the file having the "storage level 6". If a plurality of files satisfy the condition, the corresponding file is a file at the last time of the final access time. Then, in the subsequent description, the file with the lowest priority means the file corresponding to the condition based on the above-explained access history.

If the file (i) is searched in step S502, data in the file (i) recorded to the buffer area BU in the buffer area E1 is recorded to a required division in the magnetic tape 40 in step S503. Sequentially, the storage level of the file (i) in the file information table E2 is updated from "6" to "7" in step 504.

If it is determined that the number of the areas BU is larger than the threshold "A2" in step S501, it is determined whether or not a passing time from the present time to the write end time, namely, from the end of recording to the present time, is larger than a predetermined threshold T among the files having the "storage level 6" in step S505. If it is determined that the passing time is larger than the threshold T in step S505, the file at the last write end time becomes the file (i) in step S506. And, the processing routine shifts to step S503. Incidentally, if the passing time is smaller than the threshold T, the storage level is not updated.

3-3-3. From "Storage Level 7" to "Storage Level 3"

Figure 30:
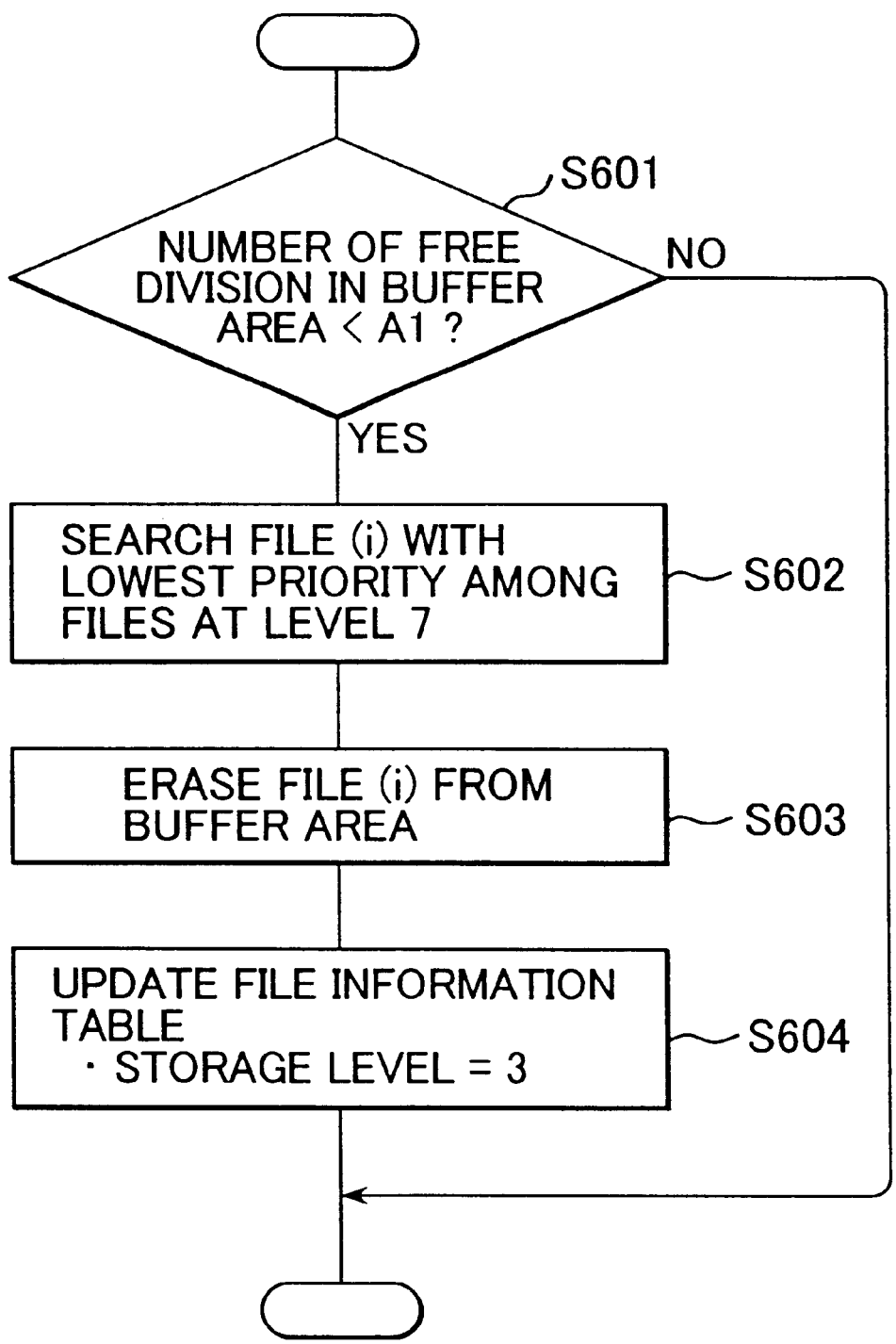
FIG. 30 is a flowchart showing further another example in the case of updating (recording) the storage level.

FIG. 30 is a flowchart for illustrating steps of updating the storage level of the file from "7" to "3"In processing steps shown in FIG. 30, the data is recorded or reproduced just before using a new division in the magnetic tape 40.

Starting to record data in the data storage device 1, it is determined whether or not the number of unused areas BU in the buffer area E1 is smaller than, for instance, a threshold "A1" in step S601. If it is determined that the number of unused areas BU in the buffer area E1 is smaller than the threshold "A2" in step S601, the file (i) with the lowest priority is searched in the files having the "storage level 7" in the file information table E2 in step S602. In the flowchart shown in FIG. 30, the file with the lowest priority is also determined under the condition that the number of access times to the file is the smallest among the files having the "storage level 7". Further, if a plurality of files satisfy the condition, the corresponding file is a file at the last time of the final access time.

After the file (i) is searched in step S602, the data in the file (i) recorded to the buffer area BU in the buffer area E1 is erased in step S603. Sequentially, the storage level of the file (i) in the file information table E2 is updated from "7" to "3" in step 604.

3-3-4. From "Storage Level 3" to "Storage Level 1"

Figure 31:
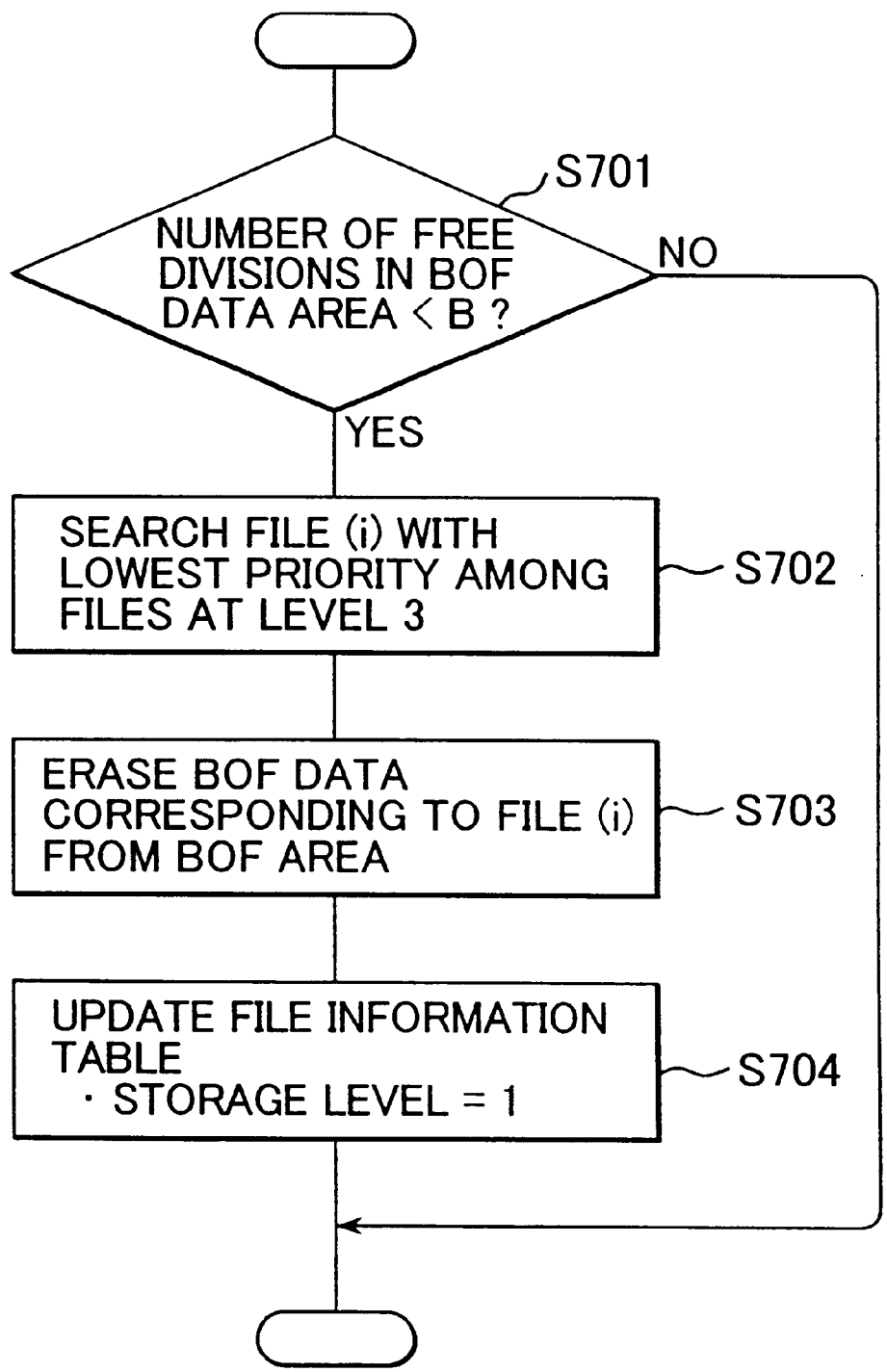
FIG. 31 is a flowchart showing still another example in the case of updating (recording) the storage level.

FIG. 31 is a flow chart for illustrating steps of updating the storage level of the file from "3" to "1"Processing steps shown in FIG. 31 are performed just before writing the BOF data to the BOF data area E4.

Starting to record data in the data storage device 1, it is determined whether or not the capacity of a free area in the BOF data area E4 is larger than a predetermined threshold B in step S701. If it is determined that the free area is smaller than the threshold B, the file (i) with the lowest priority is searched among the files having the "storage level 3" in the file information table E2 in step S702.

After searching the file (i) in step S702, the BOF data in the file (i) recorded to the area BU in the buffer area E1 is erased from the BOF data area E4 in step S703. Then, the storage level of the file (i) is updated from "3" to "1" in the file information table E2 in step S704. Incidentally, if the free area in the BOF data area E4 is larger than the threshold B in step S701, it is assumed that the BOF data can be recorded. The BOF data which has been already recorded is not erased and the storage level is not updated.

As described above, if the remaining capacity of the BOF data area E4 becomes small, the BOF data with the lowest priority is erased and the BOF data can be newly recorded.

3-3-5. Reproduction

Figure 32:
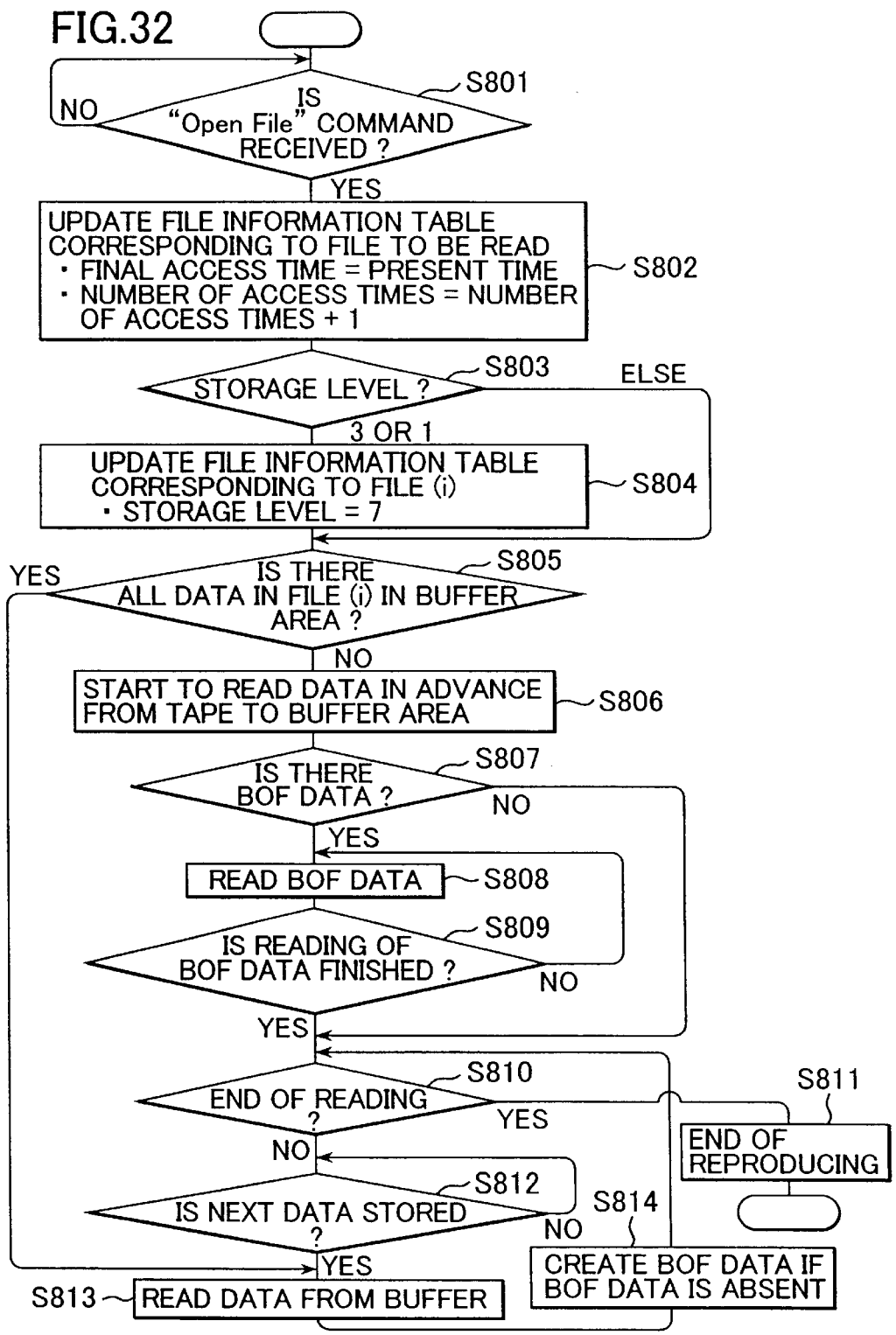
FIG. 32 is a flowchart showing one example in the case of updating (reproducing) the storage level.

A description is given of processing steps updating the storage level based on the number of access times upon reproducing data with reference to FIG. 32 hereinbelow.

First, it is determined whether or not the "Open File" command for instructing the start of recording is supplied by the drive unit 44 in the computer device 41 in step S801. If it is determined that the "Open File" command is supplied in step S801, the file information table E2 corresponding to the file to be reproduced is updated in step S802. In step S802, the final access time is updated to the present time and the number of access times is incremented. Subsequently, the storage level of the file (i) to be reproduced is determined in step S803. If the storage level is "1" or "3" in step S803, the storage level of the file information table E2 corresponding to the file (i) is updated in step S804.

It is determined that all data of the file (i) is stored in the buffer area E1 in step S805. If it is determined that all data is stored in the buffer area E1 in step S805, the reading of data from the magnetic tape 40 starts and the read-out data is stored in the buffer area E1 in step S806. Further, it is determined whether or not the BOF data corresponding to the file (i) is recorded in step S807. If it is determined that the BOF data is recorded in step S807, the recording of the BOF data starts in step S808. After starting to read the BOF data, it is determined whether or not the reading of the BOF data ends in step S809.

If it is determined that the reading of the BOF data ends in step S809, it is determined whether or not the reading of the file (i) ends in step S810. Herein, if it is determined that the reading of the file (i) ends in step S810, the reproduction ends in step S811.

If it is determined that the reading of the file (i) does not end in step S810, it is determined whether or not the data read from the magnetic tape 40 is stored in the buffer area E1 in step S812. If it is determined that the data to be read is stored in the buffer area E1 in step S812, the data stored in the buffer area E1 is read out in step S813, and the read data is transferred to the computer device 41. If it is determined that there is no BOF data corresponding to the file (i) in step S807, the BOF data in the file (i) is recorded to the BOF data area E4 in step S814. The capacity of the BOF data area to be recorded in step S814 is, e.g., VT/8 (MB) as mentioned above. Thereafter, the processing routine returns to step S810, whereupon it is determined whether or not the reading of the file ends.

If it is determined that all data of the file (i) is stored in the buffer area E1 in step S805, the processing routine proceeds to step S813 whereupon a step of reading the BOF data is omitted and the data stored in the buffer area E1 is read out.

As described above, upon reproducing the file, the number of access times to the file information table E2 is updated every access to the file and the BOF data is recorded as the necessity may arise. Thereby, the priority can be increased as the number of using times of the file is larger, and data can be read by effectively using fast-access performance of the hard disk unit 3.

3-3-6. Erasure of File

Figure 33:
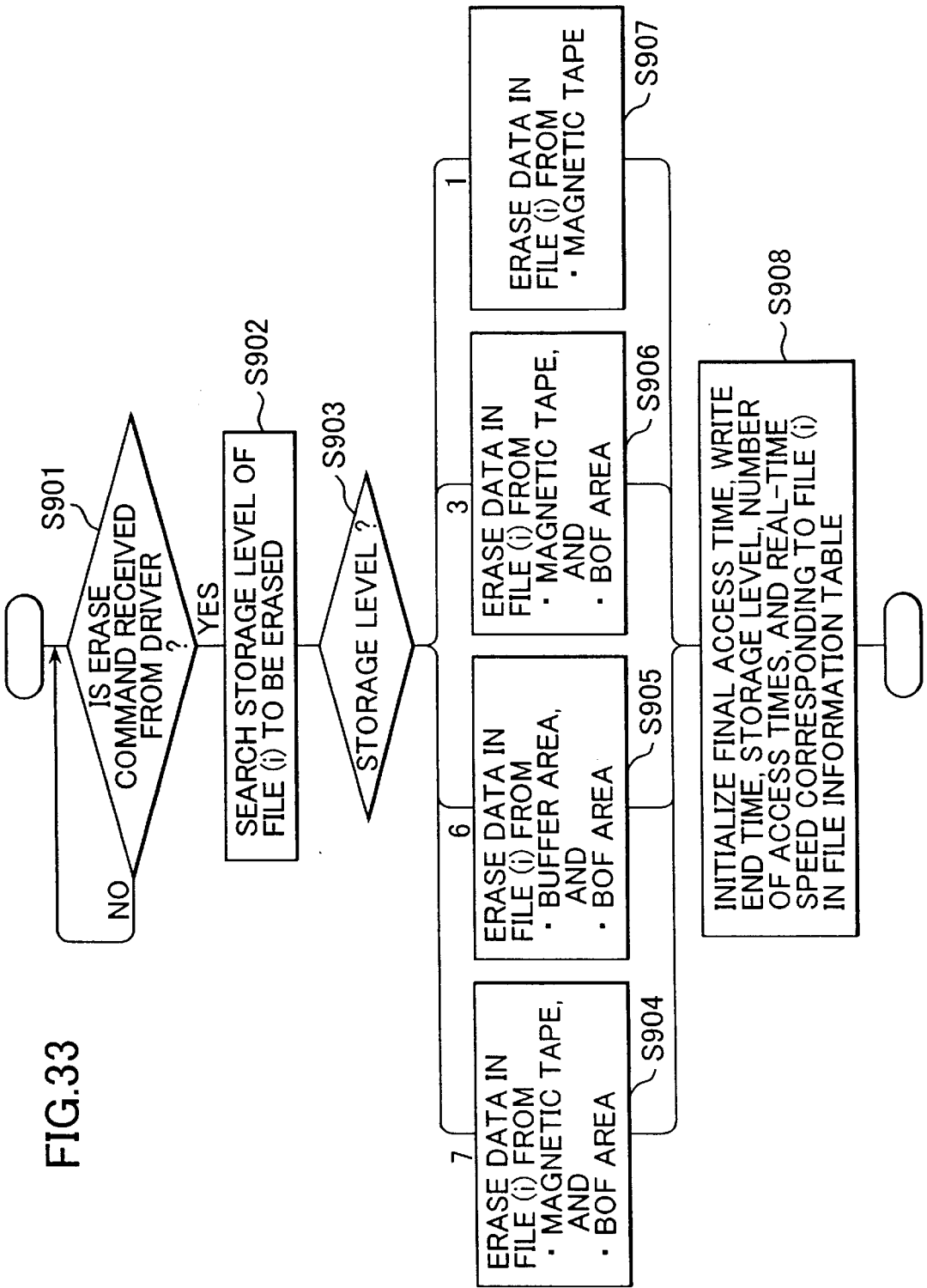
FIG. 33 is a flowchart showing one example in the case of updating (erasing) the storage level.

FIG. 33 is a flowchart for illustrating one example of processing steps of erasing the file recorded in the data storage device 1.

If it is determined that the erase command is supplied by the drive unit 44 in the computer device 41 in step S901, the storage level of the file (i), which is instructed by the erase command, is searched in the file information table E2 in step S902. Then, the storage level is determined in step S903. If it is determined that the storage level is "7" in step S903, the data in the file (i) is erased from the magnetic tape 40, the buffer area E1, and the BOF data area E4 in step S905. If it is determined that the storage level is "3" in step S903, the data in the file (i) is erased from the magnetic tape 40 and the BOF data area E4 in step S906. Further, it is determined that the storage level "1" in step S903, the data in the file (i) is erased from the magnetic tape 40 in step S907.

A process in step S908 is to initialize the final access time, the write end time, the storage level, the number of access times, and the real time speed corresponding to the file (i) in the file information table E2.

3-4. Life Cycle of File

Figure 34:
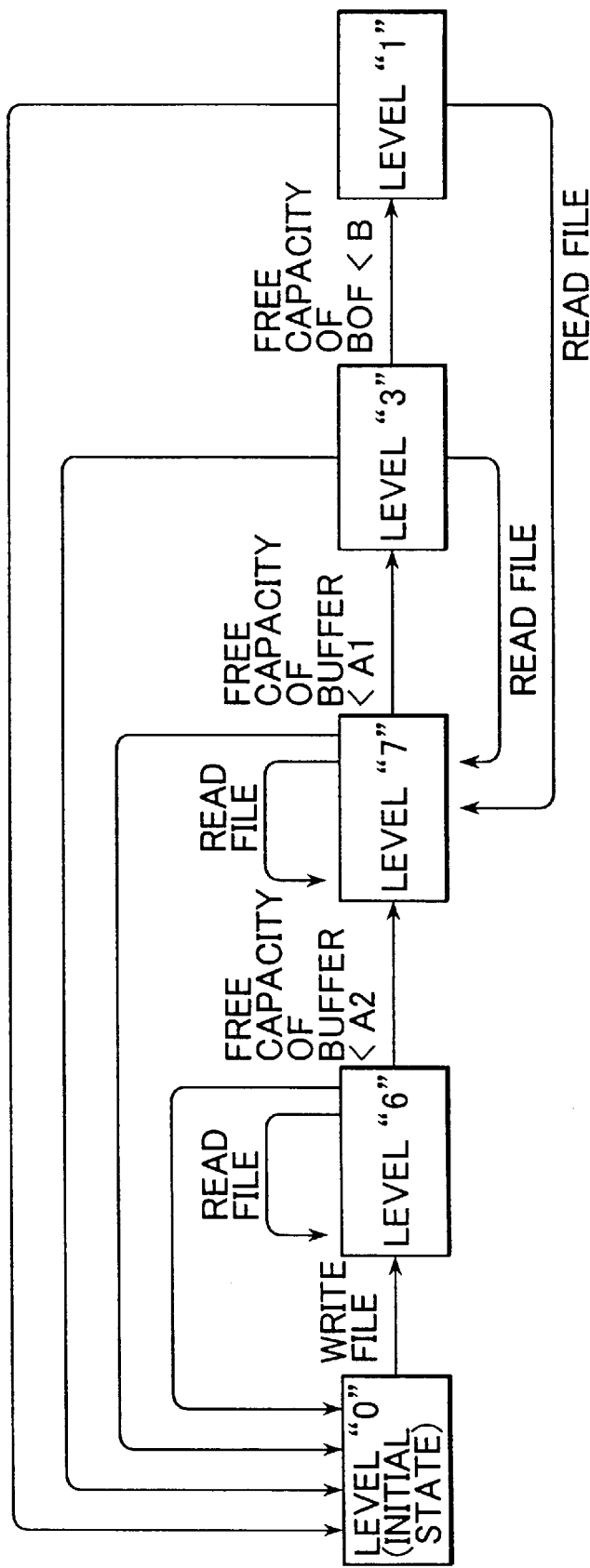
FIG. 34 is a diagram for illustrating a life cycle of the file.

Next, a description is given of the life cycle of file based on the storage level updated in the above manner with reference to FIG. 34 hereinbelow.

When the file (i) is newly formed and recorded, the storage level is updated from the initial "storage level 0" to the "storage level 6". With the storage level "6", the data is stored only in the buffer area E1. If the file (i) in this state is reproduced, the number of access times is incremented and the storage level is not updated.

The storage level is updated from "6" to "7" under the condition that the capacity of a free area in the buffer area E1 is equal to or less than the threshold A2. This update is performed when a new division is used, for example, upon recording and reproducing the file (i). Further, similarly to the case of the storage level "6" the number of access times is incremented and the storage level is not updated.

The storage level is updated from "7" to "3" under the condition that the capacity of a free area in the buffer area E1 is equal to or less than the threshold A1. This condition is satisfied when a new division is used during recording and reproduction. Incidentally, the data is reproduced after updating the storage level of the file (i) to "3", then, the read-out data is stored in the buffer area E1, and thus the storage level is updated to "7" again.

The storage level is updated from "3" to "1" under the condition that the capacity of a free area in the BOF data area E4 is equal to or less than the threshold B. The data is reproduced after updating the storage level of the file (i) to "1", then, the read-out data is stored in the buffer area E1 in the same manner as that of the storage level "3" and thus the storage level is updated to "7" again.

Moreover, if the file (i) is erased based on the instruction from the computer device 41 with the storage levels "6", "7", "3", and "1" of the file (i), the storage level is set to the initial value "0" and also the information stored in the file information table E2 is initialized as mentioned above in FIG. 33.

The data recorded to the hard disk unit 4 or magnetic tape 40 is managed based on the storage level as described earlier. Consequently, the capacity of the hard disk unit 4 can be efficiently used. Also, the hard disk unit 4 may have a necessary and minimum capacity in the data storage device 1, thus reducing costs.

The storage level is varied depending on the access history such as the number of access times to the file. Thereby, in the case of the file to be accessed relatively frequently, the BOF data can be formed and stored in the BOF data area E4 and, thus, the head portion of the file to be accessed frequently can be read out from the hard disk unit 4 and can be transferred to the computer device 41. In other words, even if the reproduction of data is requested by the computer device 41, in quick response to the request, the transfer of data can start.

Further, in the case of the file when only short time elapses after end of recording or the file when only short time elapses after end of reproduction, although depending on the capacity, the data of all files is stored in the buffer area E1. Therefore, the data can be transferred to the computer device 41 without accessing the magnetic tape 40.

4. Selection of Division

In the case of recording the data to the data storage device 1, the data transferred by the computer device 41 is temporarily stored in the buffer area E1 of the hard disk unit 3 and, thereafter, the stored data is recorded to the magnetic tape 40 as described above. In this case, if all of the data of the recorded file can be stored in the buffer area E1, the data storage device 1 can recognize the data size of the file based on the capacity of the data stored in the buffer area E1. However, consider that the file size is larger than the capacity of a free area in the buffer area E1 and the recording of all data to the magnetic tape 40 starts before storing all data in the buffer area E1, the recording of data to the magnetic tape 40 starts without determining the file size.

This results in varying conditions for selecting the division upon recording the data to the magnetic tape 40 depending on determination of the file size.

FIGS. 35A to 35E are schematic diagrams for illustrating examples of methods for determining the division in the case of recording the data stored in the hard disk unit 4 to the magnetic tape 40 in the data storage device 1. Incidentally, FIGS. 35A to 35E show that the twenty magnetic tapes 40a to 40t are a single continuous magnetic tape.

Figures 35A, 35B, 35C, 35D, 35E:
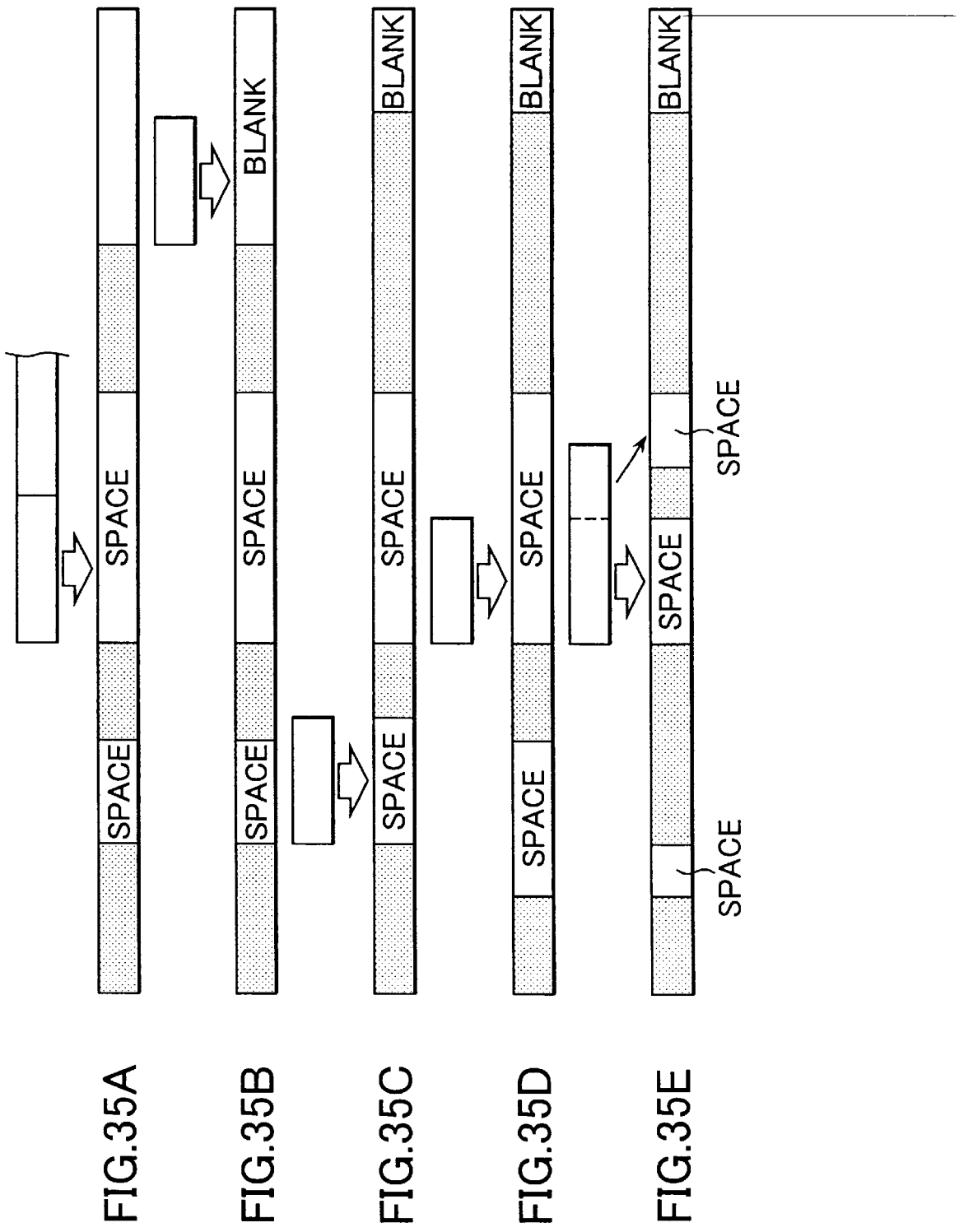
FIGS. 35A to 35E are schematic diagrams for illustrating selection of a division to which data is recorded.

As shown in FIG. 35A, if the size of the file to be recorded is unknown, the division in a maximum-space area is selected in the magnetic tape 40 and the data is recorded. In this case, for example, the size of the space area, which is formed on the magnetic tape 40 of all tape cassettes arranged to the changer unit 5, may be recognized by referring to the division access map E3, etc. based on the use status of the division and the like.

As shown in FIG. 35B, if the file size is known and there is a blank area having a size equal to the known file-size or more in the magnetic tape 40, the division in the blank area is selected and the data is recorded. Also, in this case, the size of the blank area, which is formed on the magnetic tape 40 of all tape cassettes arranged to the changer unit 5, may be recognized by referring to the division access map E3, etc. based on the use status of the division and the like.

Further, as shown in FIG. 35C, if the file size is known and there is no blank area having a size equal to the known file-size or more and there is a space area which matches to the file size, the division in the space area is selected and the data is recorded.

In the case where the file size is known, excluding the cases shown in FIGS. 35B and 35C, as shown in FIGS. 35D and 35E, the division in the maximum-space area is selected and the data is recorded.

If the data is recorded from the maximum space area as shown in FIG. 35E and all data cannot be recorded to the space area, the division having a second maximum-space area is selected and recorded.

Then, if the data is recorded in the manner as shown in FIGS. 35A to 35E and all data cannot be recorded by using the space area and the black area, it is assumed that the writing operation of the file is impossible, thus setting this case as a write error.

FIG. 36 is a flowchart for illustrating one example of steps of selecting the division upon starting to record the data to the magnetic tape 40 in the data storage device 1.

Starting to record data to magnetic tape 40 in the data storage device 1, first, it is determined whether or not the size of the file to be recorded is known in step S1001. If it is determined that the file size is not known in step S1001, the data is recorded starting with, for example, the head division in the maximum-space area in step S1002. Starting to record the data to the division, it is determined whether or not all data in the file is completely written to the space area in step S1003. If it is determined that all data is completely written in step S1003, the recording operation ends in step S1004.

If it is determined that all data is not completely written in step S1003, it is determined whether or not there is a space area in step S1005. If it is determined that there is no space area in step S1005, it is assumed that the data cannot be recorded any more, thus setting this case as a write error in step S1006. In addition, if it is determined that there is a space area in step S1005, the processing routine returns to step S1001.

If it is determined that the size of the file to be recorded is known in step S1001, it is determined whether or not there is a blank area having a size equal to the known file-size or more in step S1007. If it is determined that there is a blank area in step S1007, the data is recorded to the division in the blank area in step S1008. If it is determined that the recording of the data ends in step S1009, the recording to the magnetic tape 40 ends in step S1004.

If it is determined that there is no blank area having a size equal to or more than the size of the file to be recorded in step S1007, it is determined whether or not there is a space area which matches to the file size in step S1010. If it is determined that there is a space area which matches to the file size in step S1010, the data is recorded to the division in the space area in step S1011. If it is determined that all data is written, the recording operation ends in step S1004.

Furthermore, if it is determined that there is no space area which matches the size of the file to be recorded in step S1010, it is determined whether or not there is another space area in step S1013. If it is determined that there is the other space area in step S1013, the data is recorded to the division in the maximum-space area among other space areas in step S1014. If it is determined that all data is completely written to the space area in step S1015, the reproduction operation ends in step S1004. If it is determined that all data cannot be recorded in step S1015, the processing routine returns to step S1010.

Incidentally, if it is determined that there is no more space in step S1013, it is assumed that the data cannot be recorded any more, thus setting the case as a write error in step S1016.

In the data storage device 1, the data is efficiently recorded in consideration of the file size to be recorded and the capacity of the space area or blank area which is formed on the magnetic tape 40 as described earlier. Thereby, the section of the recorded file can be suppressed. Therefore, it is also capable of reading out the file by necessary and minimum access operation upon reproducing the file.

In addition, the magnetic tape 40 can be averagely used and, thereby, the life of the magnetic tape can be prolonged.

As mentioned above, in the recording and reproducing apparatus according to the present invention, the hard disk drive means has a buffer area, thereby recording and reproducing the data to the magnetic tape via the buffer area. The respective recording areas on the magnetic tape accommodated in the tape cassette disposed to the changer means are managed as a continuously formed area. Therefore, the magnetic tape accommodated in a plurality of tape cassettes can be handled as a single magnetic tape with a large capacity. That is, the hard disk drive means can be fast accessed and the magnetic tape has a large capacity. Therefore, it is possible to provide the apparatus suitable to record and reproduce the vide data which requires a large capacity and the real time performance.

When the data is recorded and reproduced by forming the buffer area and a plurality of areas corresponding to the recording area on a predetermined unit to be formed on the magnetic tape, advantageously, the buffer area can easily correspond to the magnetic tape.

Further, according to the present invention, the hard disk drive means can be efficiently employed on the basis of the using frequency of the file based on the access history, etc. and the free area of the buffer area or the cue data area. Therefore, with respect to the file which is frequently used, the overall file and the cue data can be recorded to the hard disk drive means. The head of the file and an arbitrary position can be fast accessed. With respect to the file which is not frequently used, the file is erased from the hard disk drive means and is recorded only to the magnetic tape. This results in making it possible to selectively record the file which is relatively frequently accessed to the hard disk drive means. The capacity can be efficiently used. Consequently, a larger amount of data of the file with higher using frequency can be recorded to the hard disk drive means as much as possible. Since it is sufficient that the necessary and minimum capacity can be assured as compared with the capacity of the file, advantageously, costs as the whole recording and reproducing apparatus can be reduced.

What is claimed is:

1. A recording and reproducing apparatus comprising:
    changer means for selecting and carrying a plurality of tape cassettes, said plurality of tape cassettes being arranged therein and accommodating magnetic tapes on which a plurality of recording areas on a predetermined unit are formed;
    tape drive means for loading the tape cassette carried by said changer means and for recording to and reproducing from the magnetic tape accommodated in said tape cassette;
    hard disk drive means at least having a buffer area for recording and reproducing data in said tape drive means and a cue data area for recording cue data as part of a file to be recorded to said magnetic tape;
    recording area managing means for managing each recording area of the magnetic tape accommodated in the tape cassette arranged in said changer means as a continuously formed area;
    recording state managing means for managing the recording states of the file in said magnetic tape, said buffer area, and said cue data area;
    file recording control means for controlling operation for recording the file in said magnetic tape and said buffer area;
    cue data recording control means for forming cue data of said file and for recording the formed data to the cue data area; and
    erasing control means for controlling operation for erasing said recorded file or said cue data of the file, wherein
        when the capacity of a free area in said buffer area is equal to or less than a predetermined amount after said file is stored in said buffer area upon recording said file,
        said file recording control means records the file stored in said buffer area to said magnetic tape, wherein when the capacity of a free area in said buffer area is equal to or less than a predetermined amount in a state where said file has been recorded to both the buffer area and the magnetic tape,
        said erasing control means erases from said buffer area, the file with the lowest priority based on the access history of the files whose data has been recorded in said buffer area, said cue data area, and said magnetic tape in the recording state managed by said recording state managing means.

2. A recording and reproducing apparatus comprising:
    changer means for selecting and carrying a plurality of tape cassettes, said plurality of tape cassettes being arranged therein and accommodating magnetic tapes on which a plurality of recording areas on a predetermined unit are formed;
    tape drive means for loading the tape cassette carried by said changer means and for recording to and reproducing from the magnetic tape accommodated in said tape cassette;
    hard disk drive means at least having a buffer area for recording and reproducing data in said tape drive means and a cue data area for recording cue data as part of a file to be recorded to said magnetic tape;
    recording area managing means for managing each recording area of the magnetic tape accommodated in the tape cassette arranged in said changer means as a continuously formed area;
    recording state managing means for managing the recording states of the file in said magnetic tape, said buffer area, and said cue data area;
    file recording control means for controlling operation for recording the file in said magnetic tape and said buffer area;
    cue data recording control means for forming cue data of said file and for recording the formed data to the cue data area; and
    erasing control means for controlling operation for erasing said recorded file or said cue data of the file, wherein
        when the capacity of a free area in said buffer area is equal to or less than a predetermined amount after said file is stored in said buffer area upon recording said file,
        said file recording control means records the file stored in said buffer area to said magnetic tape, wherein when the capacity of a free area in said cue data area is equal to or less than a predetermined amount,
        said erasing control means erases from said cue data area, the cue data corresponding to the file with the lowest priority based on the access history of the file whose data has been recorded to said buffer area and to said magnetic tape, as the recording state managed by said recording state managing means.

3. An apparatus according to claim 2, wherein said cue data recording control means specifies the capacity of said cue data on the basis of the transfer speed of a file which is externally supplied.

4. A file managing method for a recording and reproducing apparatus having:
- changer means for selecting and carrying a plurality of tape cassettes, said plurality of tape cassettes being arranged therein and accommodating magnetic tapes on which a plurality of recording areas on a predetermined unit are formed;
- tape drive means for loading the tape cassette carried by said changer means and for recording to and reproducing from the magnetic tape accommodated in said tape cassette;
- hard disk drive means having at least a buffer area for recording and reproducing data in said tape drive means and a cue data area for recording cue data as part of a file to be recorded to said magnetic tape; and
- recording area managing means for managing each recording area on the magnetic tape accommodated in the tape cassette arranged in said changer means as a continuously formed area, said method comprising:
- a recording state managing step of managing the recording states of said file in said magnetic tape, said buffer area, and said cue data area;
- a file recording control step of controlling operation for recording the file in said magnetic tape and said buffer area;
- a cue data recording control step of forming the cue data of said file and for recording the formed data to the cue data area; and
- an erasing control step of controlling operation for erasing said recorded file or the cue data of the file, wherein
  when the capacity of a free area in said buffer area is equal to or less than a predetermined amount after said file is stored in said buffer area upon recording said file,
  in said file recording control step, the file stored in said buffer area is recorded to said magnetic tape, wherein when the capacity of a free area in said buffer area is equal to or less than a predetermined amount in a state where said file is recorded to both the buffer area and the magnetic tape,
  in said erasing control step, the file with the lowest priority based on the access history of the files whose data has been recorded in said buffer area, said cue data area, and said magnetic tape as the recording state managed by said recording state managing means is erased from said buffer area.

5. A file managing method for a recording and reproducing apparatus having:
- changer means for selecting and carrying a plurality of tape cassettes, said plurality of tape cassettes being arranged therein and accommodating magnetic tapes on which a plurality of recording areas on a predetermined unit are formed;
- tape drive means for loading the tape cassette carried by said changer means and for recording to and reproducing from the magnetic tape accommodated in said tape cassette;
- hard disk drive means having at least a buffer area for recording and reproducing data in said tape drive means and a cue data area for recording cue data as part of a file to be recorded to said magnetic tape; and
- recording area managing means for managing each recording area on the magnetic tape accommodated in the tape cassette arranged in said changer means as a continuously formed area, said method comprising:
- a recording state managing step of managing the recording states of said file in said magnetic tape, said buffer area, and said cue data area;
- a file recording control step of controlling operation for recording the file in said magnetic tape and said buffer area;
- a cue data recording control step of forming the cue data of said file and for recording the formed data to the cue data area; and
- an erasing control step of controlling operation for erasing said recorded file or the cue data of the file, wherein
  when the capacity of a free area in said buffer area is equal to or less than a predetermined amount after said file is stored in said buffer area upon recording said file,
  in said file recording control step, the file stored in said buffer area is recorded to said magnetic tape, wherein when the capacity of a free area in said cue data area is equal to or less than a predetermined amount, in said erasing control step, the cue data corresponding to the file with the lowest priority based on the access history of the file whose data is recorded to said buffer area and to said magnetic tape, as the recording state managed by said recording state managing means, is erased from said cue data area.

6. A method according to claim 5, wherein, in said cue data recording control step, the capacity of said cue data is specified on the basis of the transfer speed of a file which is externally supplied.

7. A recording and reproducing apparatus comprising:
- tape drive means for recording to and reproducing from a magnetic tape;
- hard disk drive means having at least a buffer area for recording or reproducing a file by said tape drive means and a cue data area for recording cue data as part of the file recorded by said magnetic tape;
- recording state managing means for managing the recording states of said file in said magnetic tape, said buffer area, and said cue data area;
- file recording control means for controlling operation for recording the file to said magnetic tape and said buffer area;
- cue data recording control means for controlling operation for forming cue data of said file and controlling operation for recording the formed data to said cue data area: and
- erasing control means for controlling operation for erasing said recorded file or said cue data of the file, wherein
  when the capacity of a free area in said buffer area is equal to or less than a predetermined amount after said file is stored in said buffer area upon recording said file,
  said file recording control means records the file stored in said buffer area to said magnetic tape, wherein the capacity of a free area in said buffer area is equal to or less than a predetermined amount in a state where said file is recorded to both the buffer area and the magnetic tape,
  said erasing control means erases from said buffer area, the file with the lowest priority based on the access history to the files whose data has been recorded in said buffer area, said cue data area, and said magnetic tape as the recording state managed by said recording state managing means.

8. A recording and reproducing apparatus comprising:
tape drive means for recording to and reproducing from a magnetic tape;
hard disk drive means having at least a buffer area for recording or reproducing a file by said tape drive means and a cue data area for recording cue data as part of the file recorded by said magnetic tape;
recording state managing means for managing the recording states of said file in said magnetic tape, said buffer area, and said cue data area;
file recording control means for controlling operation for recording the file to said magnetic tape and said buffer area;
cue data recording control means for controlling operation for forming cue data of said file and controlling operation for recording the formed data to said cue data area; and
erasing control means for controlling operation for erasing said recorded file or said cue data of the file, wherein
 when the capacity of a free area in said buffer area is equal to or less than a predetermined amount after said file is stored in said buffer area upon recording said file,
 said file recording control means records the file stored in said buffer area to said magnetic tape, wherein when the capacity of a free area in said cue data area is equal to or less than a predetermined amount,
 said erasing control means erases from said cue data area, the cue data corresponding to the file with the lowest priority based on the access history of the file whose data has been recorded to said buffer area and to said magnetic tape, as the recording state managed by said recording state managing means.

9. An apparatus according to claim 8, wherein said cue data recording control means specifies the capacity of said cue data on the basis of the transfer speed of a file which is externally supplied.

10. A file managing method for a recording and reproducing apparatus having:
tape drive means for recording to and reproducing from a magnetic tape; and
hard disk drive means having at least a buffer area for recording and reproducing data in said tape drive means and a cue data area for recording cue data as part of a file recorded to said magnetic tape,
said method comprising:
 a recording state managing step of managing the recording states of said file in said magnetic tape, said buffer area, and said cue data area;
 a file recording control step of controlling operation for recording the file to said magnetic tape and said buffer area;
 a cue data recording control step of controlling operation for forming cue data of said file and controlling operation for recording the formed data to said cue data area; and
 an erasing control step of controlling operation for erasing said recorded file or said cue data of the file, wherein
  when the capacity of a free area in said buffer area is equal to or less than a predetermined amount after said file is stored in said buffer area upon recording said file,
  in said file recording control step, the file stored in said buffer area is recorded to said magnetic tape, wherein the capacity of a free area in said buffer area is equal to or less than a predetermined amount in a state where said file is recorded to both the buffer area and the magnetic tape,
  in said erasing control step, the file with the lowest priority based on the access history of the files whose data has been recorded in said buffer area, said cue data area, and said magnetic tape, as the recording state managed by said recording state managing means, is erased from said buffer area.

11. A file managing method for a recording and reproducing apparatus having:
tape drive means for recording to and reproducing from a magnetic tape; and
hard disk drive means having at least a buffer area for recording and reproducing data in said tape drive means and a cue data area for recording cue data as part of a file recorded to said magnetic tape,
said method comprising:
 a recording state managing step of managing the recording states of said file in said magnetic tape, said buffer area, and said cue data area;
 a file recording control step of controlling operation for recording the file to said magnetic tape and said buffer area;
 a cue data recording control step of controlling operation for forming cue data of said file and controlling operation for recording the formed data to said cue data area; and
 an erasing control step of controlling operation for erasing said recorded file or said cue data of the file, wherein
  when the capacity of a free area in said buffer area is equal to or less than a predetermined amount after said file is stored in said buffer area upon recording said file,
  in said file recording control step, the file stored in said buffer area is recorded to said magnetic tape, wherein when the capacity of a free area in said cue data area is equal to or less than a predetermined amount,
  in said erasing control step, the cue data corresponding to the file with the lowest priority based on the access history of the file whose data has been recorded to said buffer area and to said magnetic tape as the recording state managed by said recording state managing means is erased from said cue data area.

12. A file managing method for a recording and reproducing apparatus having:
tape drive means for recording to and reproducing from a magnetic tape; and
hard disk drive means having at least a buffer area for recording and reproducing data in said tape drive means and a cue data area for recording cue data as part of a file recorded to said magnetic tape,
said method comprising:
 a recording state managing step of managing the recording states of said file in said magnetic tape, said buffer area, and said cue data area;
 a file recording control step of controlling operation for recording the file to said magnetic tape and said buffer area;
 a cue data recording control step of controlling operation for forming cue data of said file and controlling operation for recording the formed data to said cue data area; and an erasing control step of controlling operation for erasing said recorded file or said cue data of the file, wherein
when the capacity of a free area in said buffer area is equal to or less than a predetermined amount after said file is stored in said buffer area upon recording said file,
in said file recording control step, the file stored in said buffer area is recorded to said magnetic tape, wherein when the capacity of a free area in said cue data area is equal to or less than a predetermined amount,
in said erasing control step, the cue data corresponding to the file with the lowest priority based on the access history of the file whose data has been recorded to said buffer area and to said magnetic tape as the recording state managed by said recording state managing means is erased from said cue data area, wherein, in said cue data recording control step, the capacity of said cue data is specified on the basis of the transfer speed of a file which is externally supplied.

* * * * *

UNITED STATES PATENT AND TRADEMARK OFFICE
CERTIFICATE OF CORRECTION

PATENT NO. : 6,778,346 B2
DATED : August 17, 2004
INVENTOR(S) : Yoshihisa Takayama et al.

It is certified that error appears in the above-identified patent and that said Letters Patent is hereby corrected as shown below:

Column 7,
Line 34, change "Are performed" to -- are performed --.

Column 11,
Line 42, change "0002" to -- 0002h --.

Column 14,
Line 31, change ""#18"respectively" to -- "#18", respectively --.
Line 33, change ""3" respectively" to -- "3", respectively --.
Line 34, change "a fore mentioned" to -- aforementioned --.

Column 19,
Line 13, change "LBAsand" to -- LBAs and --.
Line 63, change "40a nd" to -- 40 and --.

Column 21,
Line 12, change ""6"namely" to -- "6", namely, --.
Line 30, change ""0"" to -- "0", --.

Column 22,
Line 37, change ""3"In" to -- "3". In --.

Column 24,
Line 42, change ""6"the" to -- "6", the --.

Signed and Sealed this

Fourth Day of January, 2005

JON W. DUDAS
*Director of the United States Patent and Trademark Office*